United States Patent
Tamegai

(10) Patent No.: US 10,235,969 B2
(45) Date of Patent: Mar. 19, 2019

(54) ELECTRONIC APPARATUS, ELECTRONIC APPARATUS SYSTEM, AND METHOD FOR CONTROLLING ELECTRONIC APPARATUS

(71) Applicant: KYOCERA CORPORATION, Kyoto (JP)

(72) Inventor: Atsushi Tamegai, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/467,503

(22) Filed: Mar. 23, 2017

(65) Prior Publication Data

US 2017/0193967 A1 Jul. 6, 2017

Related U.S. Application Data

(63) Continuation of application No. PCT/JP2015/076686, filed on Sep. 18, 2015.

(30) Foreign Application Priority Data

Sep. 26, 2014 (JP) ................................. 2014-197276

(51) Int. Cl.
*G09G 5/10* (2006.01)
*G06F 1/16* (2006.01)
(Continued)

(52) U.S. Cl.
CPC .............. *G09G 5/10* (2013.01); *G06F 1/163* (2013.01); *G06F 3/017* (2013.01); *G06F 3/0346* (2013.01); *G09G 5/00* (2013.01); *G09G 2354/00* (2013.01)

(58) Field of Classification Search
CPC .... G09G 5/02; G09G 5/06; G09G 2320/0666; G09G 2320/0626; G06T 11/001;
(Continued)

(56) References Cited

U.S. PATENT DOCUMENTS

2009/0251407 A1 10/2009 Flake et al.
2011/0188674 A1* 8/2011 Dai .................... H03G 3/00
381/105

(Continued)

FOREIGN PATENT DOCUMENTS

| JP | 2011-221669 A | | 4/2011 |
|----|---------------|---|--------|
| JP | 2012068792 A | * | 4/2012 |
| JP | 2012-068792 A | | 5/2012 |

OTHER PUBLICATIONS

International Search Report/Written Opinion dated Dec. 22, 2015 in counterpart international application No. PCT/JP2015/076686.

(Continued)

*Primary Examiner* — Todd Buttram
(74) *Attorney, Agent, or Firm* — Duane Morris LLP

(57) ABSTRACT

An electronic apparatus, an electronic apparatus system, and a method for controlling an electronic apparatus are disclosed. An electronic apparatus communicates with an input apparatus worn on an operator body part being a part of a body of a user. The input apparatus includes a motion detector. The motion detector is configured to detect motion information indicative of a movement of the operator body part. The electronic apparatus includes a display and at least one processor. The at least one processor is configured to perform a luminance control in which a luminance of the display is controlled according to an inclination of a virtual input surface. The virtual input surface is a first surface on which a trace of the operator body part based on the motion information is drawn or a second surface parallel to the first surface.

17 Claims, 15 Drawing Sheets

(51) Int. Cl.
*G06F 3/0346* (2013.01)
*G06F 3/01* (2006.01)
*G09G 5/00* (2006.01)

(58) Field of Classification Search
CPC .. H04N 5/4403; H04N 5/44582; H04N 21/47; H04N 5/44; H04B 1/202
See application file for complete search history.

(56) References Cited

U.S. PATENT DOCUMENTS

| | | | |
|---|---|---|---|
| 2013/0088648 A1* | 4/2013 | Yoon | H04N 21/42202 348/734 |
| 2013/0207793 A1* | 8/2013 | Weaber | G06F 1/1601 340/407.2 |
| 2014/0139433 A1* | 5/2014 | Choi | G06F 3/0383 345/158 |
| 2014/0176809 A1* | 6/2014 | Chen | H04N 21/42222 348/734 |
| 2015/0261310 A1* | 9/2015 | Walmsley | G06F 1/1626 345/173 |
| 2015/0277559 A1* | 10/2015 | Vescovi | G06F 3/014 345/173 |

OTHER PUBLICATIONS

Kai, Y., "Yubiwagata Wearable Device 'Ring' wa Jitsugen Kano Ka, sono Shikumi O Project Page kara Yomitoki", [online], Mar. 3, 2014, retrieved Dec. 15, 2015, Internet: http://web.archive.org/web/20140306115314/http://thebridge.jp/2014/03/ring.

* cited by examiner

| x-AXIS COMPONENT | 0 | ax2 | ax3 | ax4 | ... | 0 |
| y-AXIS COMPONENT | 0 | 0 | 0 | 0 | ... | 0 |
| z-AXIS COMPONENT | 0 | az2 | az3 | az4 | ... | 0 |

F I G. 1 5
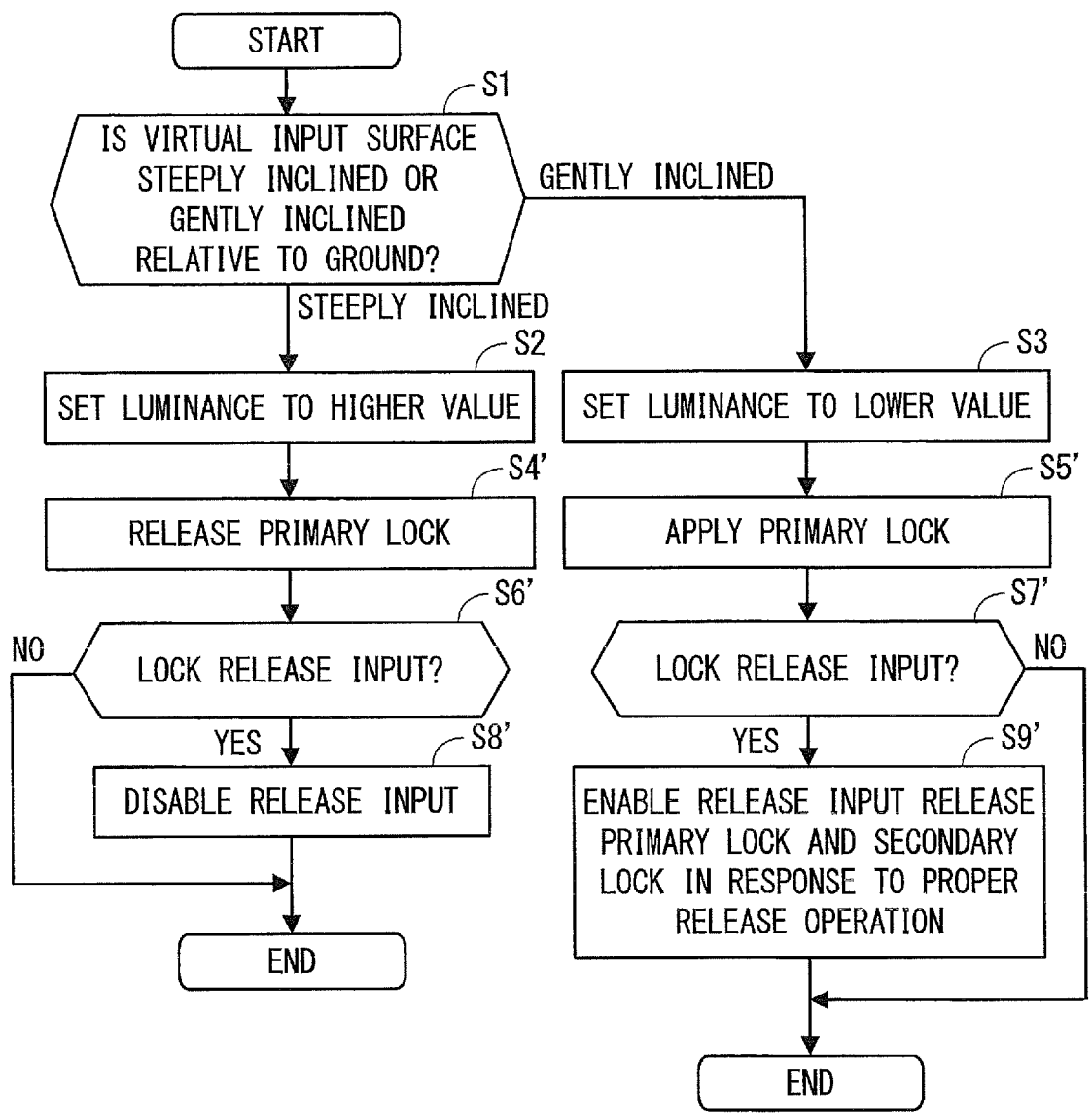

ELECTRONIC APPARATUS, ELECTRONIC APPARATUS SYSTEM, AND METHOD FOR CONTROLLING ELECTRONIC APPARATUS

CROSS-REFERENCE TO RELATED APPLICATION

The present application is a continuation based on PCT Application No. PCT/JP2015/076686, filed on Sep. 18, 2015, which claims the benefit of Japanese Application No. 2014-197276, filed on Sep. 26, 2014. PCT Application No. PCT/JP2015/076686 is entitled "ELECTRONIC APPARATUS AND ELECTRONIC APPARATUS SYSTEM", and Japanese Application No. 2014-197276 is entitled "ELECTRONIC APPARATUS AND ELECTRONIC APPARATUS SYSTEM". The contents of which are incorporated by reference herein in their entirety.

FIELD

Embodiments of the present disclosure relate to electronic apparatuses, an electronic apparatus system, and a method for controlling an electronic apparatus.

BACKGROUND

Terminals and ring-shaped input apparatuses for the terminals have been proposed. Such a ring-shaped input apparatus is to be worn by a user on his or her finger and can transmit the movement of the finger to the terminal. The terminal performs processing corresponding to the movement of the finger.

SUMMARY

An electronic apparatus, an electronic apparatus system, and a method for controlling an electronic apparatus are disclosed.

In one embodiment, an electronic apparatus communicates with an input apparatus worn on an operator body part being a part of a body of a user. The input apparatus includes a motion detector. The motion detector is configured to detect motion information indicative of a movement of the operator body part. The electronic apparatus includes a display and at least one processor. The at least one processor is configured to perform a luminance control in which a luminance of the display is controlled according to an inclination of a virtual input surface. The virtual input surface is a first surface on which a trace of the operator body part based on the motion information is drawn or a second surface parallel to the first surface.

In one embodiment, an electronic apparatus system includes an input apparatus and an electronic apparatus. The input apparatus is worn on an operator body part being a part of a body of a user and includes a motion detector. The motion detector is configured to detect motion information indicative of a movement of the operator body part. The electronic apparatus includes a display and at least one processor. The at least one processor is configured to perform a luminance control in which a luminance of the display is controlled according to an inclination of a virtual input surface. The virtual input surface is a first surface on which a trace of the operator body part based on the motion information is drawn or a second surface parallel to the first surface.

In one embodiment, a control method is for use in controlling an electronic apparatus that communicates with an input apparatus worn on an operator body part being a part of a body of a user. The input apparatus includes a motion detector. The motion detector is configured to detect motion information indicative of a movement of the operator body part. The method includes controlling a luminance of a display of the electronic apparatus according to an inclination of a virtual input surface. The virtual input surface is a first surface on which a trace of the operator body part based on the motion information is drawn or a second surface parallel to the first surface.

BRIEF DESCRIPTION OF THE DRAWINGS

FIGS. 13 to 15 each illustrate a flowchart showing an example operation performed by the controller.

DETAILED DESCRIPTION

First Embodiment

1. Overall Configuration

Figure 1:
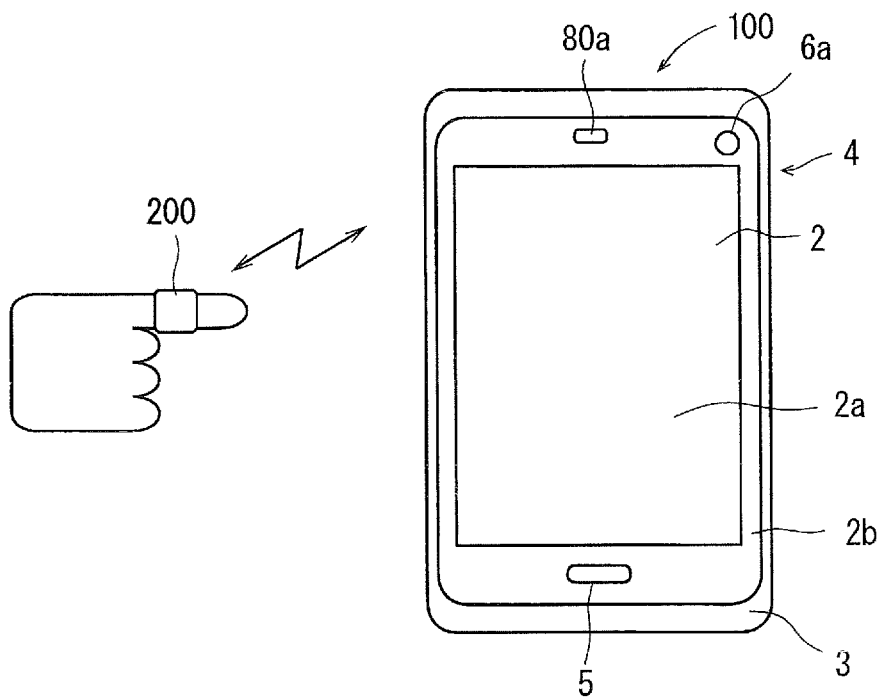
FIG. 1 schematically illustrates an example of an electronic apparatus system.

FIG. 1 schematically illustrates an example configuration of an electronic apparatus system. In the illustration of FIG. 1, the electronic apparatus system includes an electronic apparatus 100 and a wearable input apparatus 200. The electronic apparatus 100 and the wearable input apparatus 200 communicate with each other. In this electronic apparatus system, the user moves a part of his or her body, namely, an operator body part (such as a finger) to perform, on the electronic apparatus 100, an input operation corresponding to the movement. The user can operate the electronic apparatus 100 while being away from the electronic apparatus 100.

2. Wearable Input Apparatus

The wearable input apparatus 200 is to be worn by the user on his or her operator body part. In the illustration of FIG. 1, the operator body part is a finger, and the wearable input apparatus 200 has a ring shape as a whole. The user slips the wearable input apparatus 200 on the finger. The wearable input apparatus 200 is thus worn by the user. The user can spatially move the wearable input apparatus 200.

Figure 2:
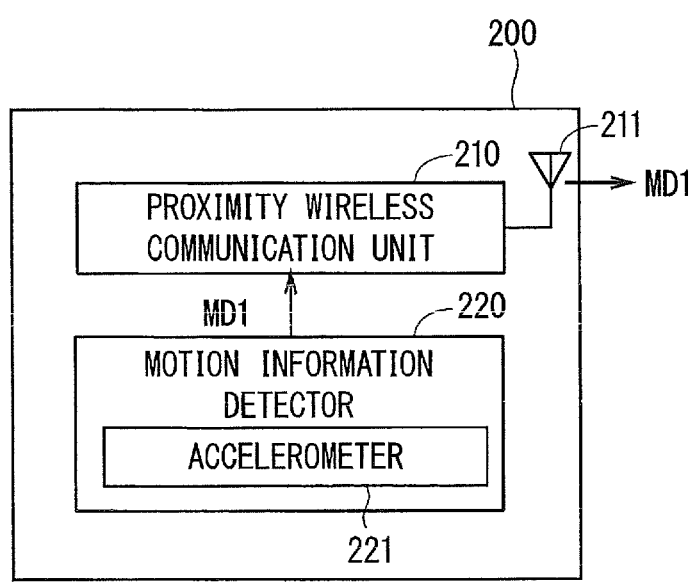
FIG. 2 schematically illustrates an example of an internal configuration of a wearable input apparatus.

FIG. 2 schematically illustrates an example of an internal electrical configuration of the wearable input apparatus 200. The wearable input apparatus 200 includes, for example, a proximity wireless communication unit 210 and a motion information detector 220.

The proximity wireless communication unit 210 includes an antenna 211 and can perform proximity wireless communication with the electronic apparatus 100 through the antenna 211. The proximity wireless communication unit 210 can conduct communication according to the Bluetooth (registered trademark) or the like.

The motion information detector 220 can detect motion information MD1 indicative of a spatial movement of the wearable input apparatus 200. The wearable input apparatus 200 is worn on the operator body part, and thus, the motion information MD1 is also indicative of a movement of the operator body part. The following description will be given assuming that the spatial movement of the wearable input apparatus 200 is equivalent to the movement of the operator body part.

The motion information detector 220 can transmit the detected motion information MD1 to the electronic apparatus 100 through the proximity wireless communication unit 210. The motion information detector 220 includes, for example, an accelerometer 221. The accelerometer 221 can obtain acceleration components in three orthogonal directions repeatedly at, for example, predetermined time intervals. The position of the wearable input apparatus 200 (the position of the operator body part) can be obtained by integrating acceleration twice with respect to time, and thus, the chronological data including values detected by the accelerometer 221 describes the movement of the operator body part. Here, the chronological data on the acceleration components in three directions is used as an example of the motion information MD1.

3. Electronic Apparatus 3-1. External Appearance

Figure 3:
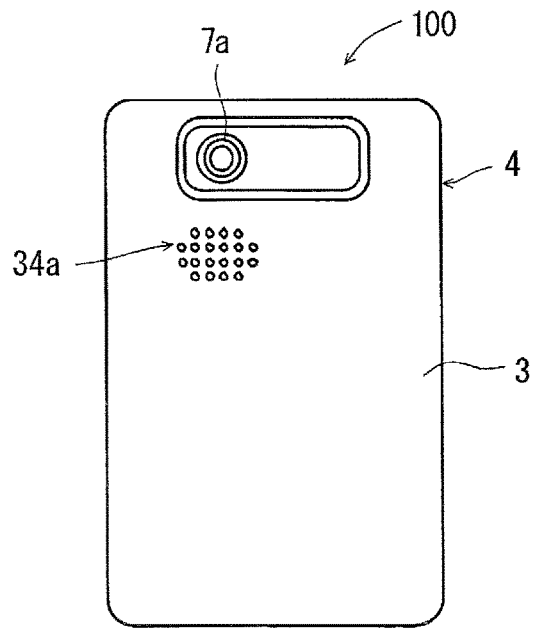
FIG. 3 illustrates a schematic rear view of an example of an external appearance of an electronic apparatus.

FIG. 1 illustrates an external appearance of the electronic apparatus 100 as viewed from the front surface side. FIG. 3 illustrates a rear view of the outline of the electronic apparatus 100. The electronic apparatus 100 is, for example, a tablet, a personal digital assistant (PDA), or a mobile phone (such as a smartphone). The electronic apparatus 100 can communicate with another communication device directly or via, for example, a base station and a server.

As illustrated in FIGS. 1 and 3, the electronic apparatus 100 includes a cover panel 2 and a case part 3. The combination of the cover panel 2 and the case part 3 forms a housing 4 (hereinafter also referred to as an "apparatus case") having, for example, an approximately rectangular plate shape in a plan view.

The cover panel 2, which may have an approximately rectangular shape in a plan view, is the portion other than the periphery in the front surface part of the electronic apparatus 100. The cover panel 2 is made of, for example, transparent glass or a transparent acrylic resin. In some embodiments, the cover panel 2 is made of, for example, sapphire. Sapphire is a single crystal based on aluminum oxide ($Al_2O_3$). Herein, sapphire refers to a single crystal having a purity of $Al_2O_3$ of approximately 90% or more. The purity of $Al_2O_3$ is preferably greater than or equal to 99%, which provides a greater resistance to damage of the cover panel. The cover panel 2 may be made of materials other than sapphire, such as diamond, zirconia, titania, crystal, lithium tantalite, and aluminum oxynitride. Similarly to the above, each of these materials is preferably a single crystal having a purity of $Al_2O_3$ of approximately 90% or more, which provides a greater resistance to damage of the cover panel.

The cover panel 2 may be a multilayer composite panel (laminated panel) including a layer made of sapphire. For example, the cover panel 2 may be a double-layer composite panel including a layer (a sapphire panel) made of sapphire and located on the surface of the electronic apparatus 100 and a layer (a glass panel) made of glass and laminated on the sapphire panel. The cover panel 2 may be a triple-layer composite panel including a layer (a first sapphire panel) made of sapphire and located on the surface of the electronic apparatus 100, a layer (a glass panel) made of glass and laminated on the first sapphire panel, and another layer (a second sapphire panel) made of sapphire and laminated on the glass panel. The cover panel 2 may also include a layer made of crystalline materials other than sapphire, such as diamond, zirconia, titania, crystal, lithium tantalite, and aluminum oxynitride.

The case part 3 forms the periphery of the front surface part, the side surface part, and the rear surface part of the electronic apparatus 100. The case part 3 is made of, for example, a polycarbonate resin.

The front surface of the cover panel 2 includes a display area 2a on which various pieces of information such as characters, signs, graphics, or images are displayed. The display area 2a has, for example, a rectangular shape in a plan view. A peripheral part 2b surrounding the display area 2a in the cover panel 2 is black because of a film or the like laminated thereon, and thus, is a non-display part on which no information is displayed. Attached to a rear surface of the cover panel 2 is a touch panel 50, which will be described below. The user can provide various instructions to the electronic apparatus 100 by operating the display area 2a on the front surface of the electronic apparatus 100 with a finger or the like. Also, the user can provide various instructions to the electronic apparatus 100 by operating the display area 2a with, for example, a pen for capacitive touch panel such as a stylus pen, instead of the operator such as the finger.

The apparatus case 4 houses, for example, an operation key 5. The operation key 5 is, for example, a hardware key and is located in, for example, the lower edge portion of the front surface of the cover panel 2.

The touch panel 50 and the operation key 5 constitutes an operation unit for use in operating the electronic apparatus 100.

3-2. Electrical Configuration of Electronic Apparatus

Figure 4:
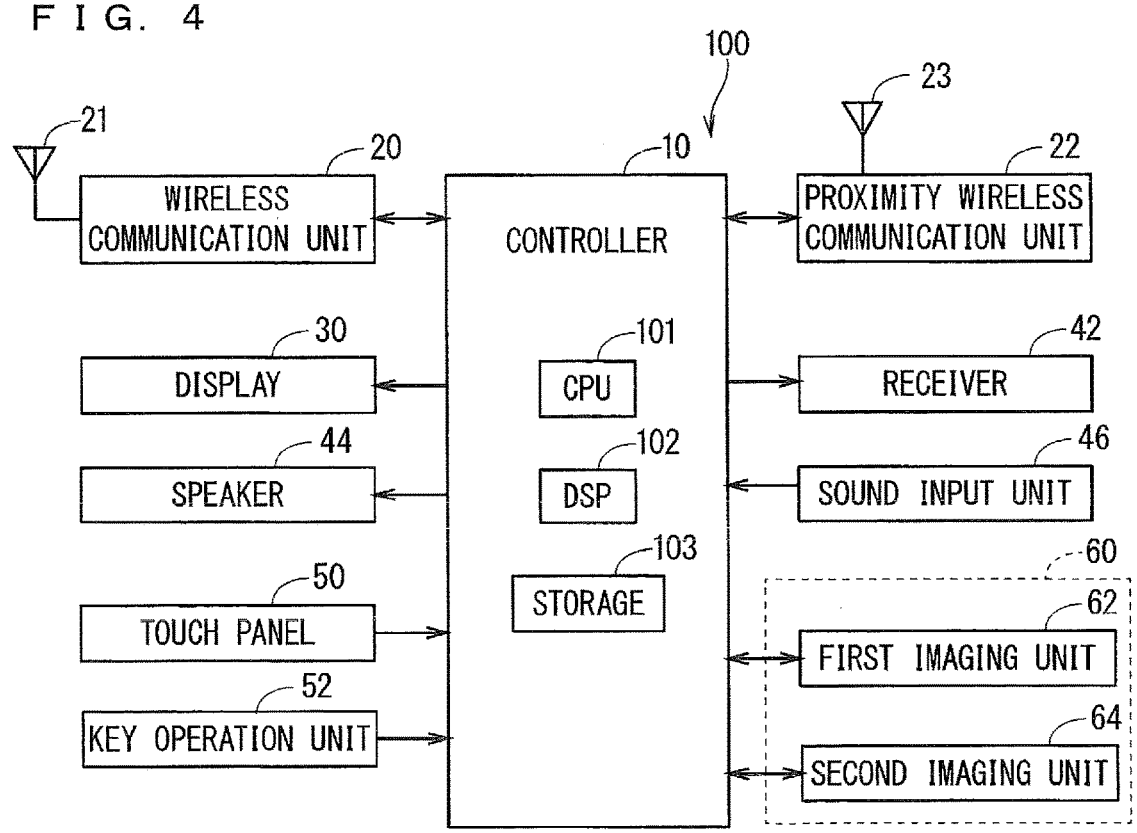
FIG. 4 schematically illustrates an example of an internal configuration of the electronic apparatus.

FIG. 4 illustrates a block diagram showing an electrical configuration of the electronic apparatus 100. As illustrated in FIG. 4, the electronic apparatus 100 includes a controller 10, a wireless communication unit 20, a proximity wireless communication unit 22, a display 30, a receiver 42, a speaker 44, a sound input unit 46, the touch panel 50, a key operation unit 52, and an imaging unit 60. The apparatus case 4 houses these constituent components of the electronic apparatus 100.

The controller 10 includes, for example, a central processing unit (CPU) 101, a digital signal processor (DSP) 102, and a storage 103. The controller 10 can control other constituent components of the electronic apparatus 100 to perform overall control of the operation of the electronic apparatus 100. The storage 103 includes, for example, a read only memory (ROM) and a random access memory (RAM). The storage 103 can store, for example, a main program and a plurality of application programs (also merely referred to as "applications" hereinafter). The main program is a control program for controlling the operation of the electronic apparatus 100, specifically, the individual constituent components of the electronic apparatus 100 such as the wireless communication unit 20 and the display 30. The CPU 101 and the DSP 102 execute the various programs stored in the storage 103 to achieve various functions of the controller 10. Although one CPU 101 and one DSP 102 are illustrated in FIG. 4, a plurality of CPUs 101 and a plurality of DSPs 102 may be included in the controller 10. The CPUs 101 and the DSPs 102 may cooperate with one another to achieve various functions. Although the storage 103 is included in the controller 10 in the illustration of FIG. 4, the storage 103 may be located outside of the controller 10. That is to say, the storage 103 may be separated from the controller 10. All or some of the functions of the controller 10 may be performed by hardware.

The wireless communication unit 20 includes an antenna 21. The wireless communication unit 20 can receive a signal from another mobile phone or a signal from communication equipment such as a web server connected to the Internet through the antenna 21 via a base station or the like. The wireless communication unit 20 can amplify and down-convert the received signal and then output a resultant signal to the controller 10. The controller 10 can, for example, demodulate the received signal. Further, the wireless communication unit 20 can up-convert and amplify a transmission signal generated by the controller 10 to wirelessly transmit the processed transmission signal through the antenna 21. The transmission signal from the antenna 21 is received, via the base station or the like, by another mobile phone or communication equipment connected to the Internet.

The proximity wireless communication unit 22 includes an antenna 23. The proximity wireless communication unit 22 can conduct, through the antenna 23, communication with a communication terminal that is closer to the electronic apparatus 100 than the communication target of the wireless communication unit 20 (e.g., a base station) is. For example, the proximity wireless communication unit 22 can communicate with the wearable input apparatus 200. The proximity wireless communication unit 22 can conduct communication according to, for example, the Bluetooth (registered trademark) standard.

The display 30 is, for example, a liquid crystal display panel or an organic electroluminescent (EL) panel. The display 30 can display various pieces of information such as characters, signs, graphic, or images under the control of the controller 10. The information displayed on the display 30 is displayed on the display area 2a on the front surface of the cover panel 2. In other words, the display 30 displays information on the display area 2a. The display 30, which is a liquid crystal display panel, can be irradiated with light by a backlight. The luminance of the display 30 can be thus adjusted according to the luminance of the backlight. The display 30 may be an organic EL panel. Although the luminance of the individual display element of the organic EL panel can be adjusted, the average luminance of the screen is adjusted in one embodiment.

The touch panel 50 can detect an operation performed on the display area 2a of the cover panel 2 with the operator such a as a finger. The touch panel 50 is, for example, a projected capacitive touch panel and is attached to the rear surface of the cover panel 2. When the user performs an operation on the display area 2a of the cover panel 2 with the operator such as the finger, a signal corresponding to the operation is input from the touch panel 50 to the controller 10. The controller 10 can specify, based on the signal from the touch panel 50, the purpose of the operation performed on the display area 2a and accordingly perform processing appropriate to the purpose.

The key operation unit 52 can detect a press down operation performed on the individual operation key 5. The key operation unit 52 can detect whether the individual operation key 5 is pressed down. When the operation key 5 is not pressed down, the key operation unit 52 outputs, to the controller 10, a non-operation signal indicating that no operation is performed on the operation key 5. When the operation key 5 is pressed down, the key operation unit 52 outputs, to the controller 10, an operation signal indicating that an operation is performed on the operation key 5. The controller 10 can thus determine whether an operation is performed on the individual operation key 5.

The receiver 42 can output a received sound and is, for example, a dynamic speaker. The receiver 42 can convert an electrical sound signal from the controller 10 into a sound and then output the sound. The sound output from the receiver 42 is output to the outside through a receiver hole 80a in the front surface of the electronic apparatus 100. The volume of the sound output through the receiver hole 80a is set to be lower than the volume of the sound output from the speaker 44 through speaker holes 34a.

The receiver 42 may be replaced with a piezoelectric vibration element. The piezoelectric vibration element can vibrate based on a sound signal under the control of the controller 10. The piezoelectric vibration element is located on, for example, the rear surface of the cover panel 2. The piezoelectric vibration element can cause, through its vibration based on the sound signal, the cover panel 2 to vibrate. The vibration of the cover panel 2 is transmitted to the user as a voice. The receiver hole 80a is not necessary for this configuration.

The speaker 44 is, for example a dynamic speaker. The speaker 44 can convert an electrical sound signal from the controller 10 into a sound and then output the sound. The sound output from the speaker 44 is output to the outside through the speaker holes 34a in the rear surface of the electronic apparatus 100. The sound output through speaker holes 34a is set to a volume such that the sound can be heard in the place part from the electronic apparatus 100. The speaker 44 outputs, for example, a received sound.

The sound input unit 46 is a microphone. The sound input unit 46 can convert the sound from the outside of the electronic apparatus 100 into an electrical sound signal and then output the electrical sound signal to the controller 10. The sound from the outside of the electronic apparatus 100 is, for example, taken inside the electronic apparatus 100 through the microphone hole in the front surface of the cover panel 2 and then is received by the sound input unit 46.

The imaging unit 60 includes, for example, a first imaging unit 62 and a second imaging unit 64. The first imaging unit 62 includes, for example, an imaging lens 6a and an image sensor. The first imaging unit 62 can capture a still image and a video under the control of the controller 10. As illustrated in FIG. 1, the imaging lens 6a is located in the front surface of the electronic apparatus 100. Thus, the first imaging unit 62 can capture an image of an object located on the front surface side (the cover panel 2 side) of the electronic apparatus 100.

The second imaging unit 64 includes, for example, an imaging lens 7a and an image sensor. The second imaging unit 64 can capture a still image and a video under the control of the controller 10. As illustrated in FIG. 3, the imaging lens 7a is located in the rear surface of the electronic apparatus 100. Thus, the second imaging unit 64 can capture an image of an objected located on the rear surface side of the electronic apparatus 100.

3-3. Controller

Figure 5:
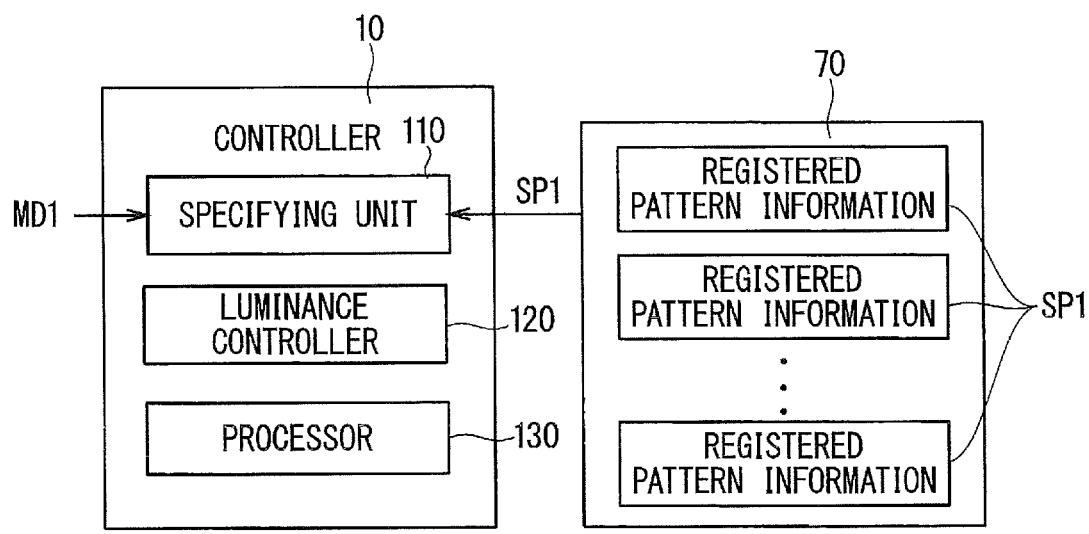
FIG. 5 schematically illustrates an example of an internal configuration of a controller.

FIG. 5 illustrates a functional block diagram schematically showing an example of an internal configuration of the controller 10. The controller 10 includes a specifying unit 110, a luminance controller 120, and a processor 130. These functional units may be implemented by, for example, executing programs stored in the storage 103. All or some of these functional units may be implemented by hardware. This holes true for other functional units, which will be described below, and will not be repeated in the following description.

The specifying unit 110 can receive the motion information MD1 from the wearable input apparatus 200 through the proximity wireless communication unit 22 to specify the movement of the wearable input apparatus 200 (the movement of the operator body part).

Figure 6:
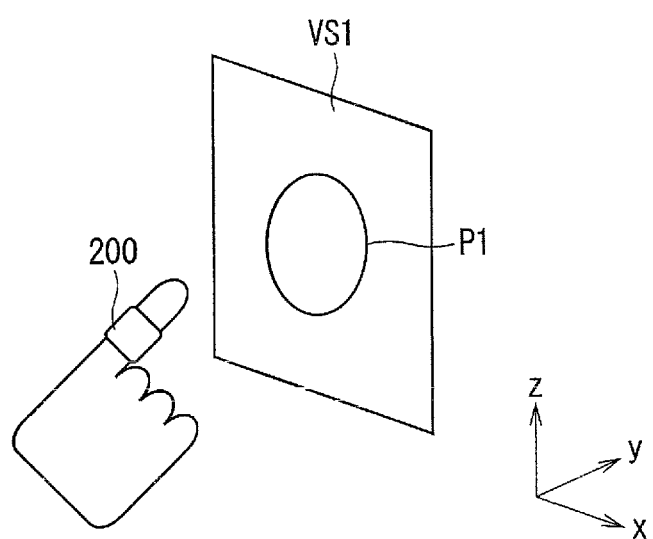
FIGS. 6 and 7 schematically illustrate the state in which the user moves an operator body part on a virtual input surface.
Figures 7, 8:
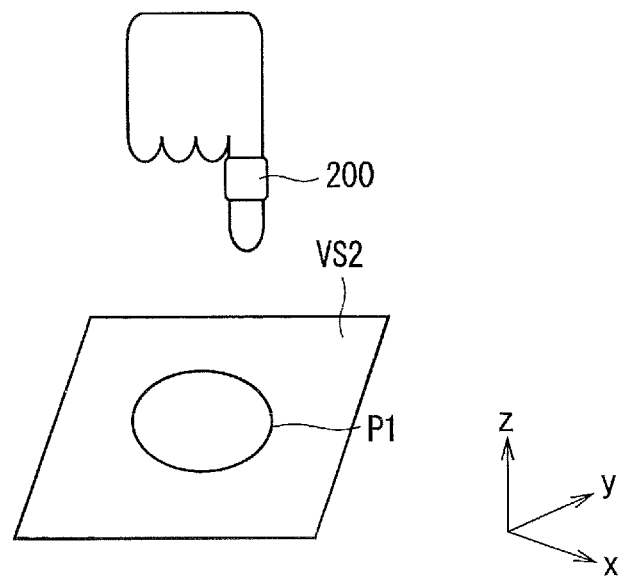
FIG. 8 schematically illustrates an example of motion information.

The movement of the operator body part will now be described. In one embodiment, the user performs an input operation on the electronic apparatus 100 by moving the operator body part on a virtual input surface in a predetermined pattern (hereinafter referred to as a "trace pattern"). FIGS. 6 and 7 schematically illustrate an example of the state in which the user moves the operator body part. For example, the user moves, as illustrated in FIG. 6, the operator body part on a vertical virtual input surface VS1 in a trace pattern P1 (such as a circle) or moves, as illustrated in FIG. 7, the operator body part on a horizontal virtual input surface VS2 in the trace pattern P1.

Examples of the trace pattern includes characters, numbers, signs, and graphics. The movement on the virtual input surface can be regarded as writing characters and numbers in a virtual manner or drawing signs and graphics in a virtual manner on the virtual input surface.

In one embodiment, the inclination of the virtual input surface indicates an input for specifying the luminance of the display 30 and the trace pattern of the movement of the operator body part on the virtual input surface indicates an input for giving instructions and the like associated with various functions of the electronic apparatus 100, as will be evident from the following description.

The specifying unit 110 can specify the inclination of the virtual input surface and the trace pattern of the movement of the operator body part on the virtual input surface.

For easy understanding of the following description, the horizontal axis that is parallel to the virtual input surface VS1 is referred to as an "x axis", the axis perpendicular to the virtual input surface VS1 is referred to as a "y axis", and the vertical axis is referred to as a "z axis" (see FIG. 6). The virtual input surface VS2 is perpendicular to the z axis and is parallel to the x axis and the y axis (see FIG. 7).

In the case where the operator body part is moved on the virtual input surface VS1, the y-axis component of the chronological data on acceleration, which is an example of the motion information MD1, is smaller than the x-axis component and the z-axis component of the data. The reason for this is that the user who is moving the operator body part on the virtual input surface VS1 does not feel much need to move the operator body part along the y axis perpendicular to the virtual input surface VS1. FIG. 8 schematically illustrates an example of the motion information MD1 based on the ideal movement of the operator body part on the virtual input surface VS1. For the sake of simplicity, the gravitational acceleration is disregarded in FIG. 8. In the illustration of FIG. 8, the y-axis component in each cell is zero.

FIG. 8 illustrates the chronological data obtained by moving the operator body part on the virtual input surface VS1 in a given trace pattern and stopping the operator body part temporarily at the starting point and the endpoint of the trace pattern. In the illustration of FIG. 8, each of the x-axis component, the y-axis component, and the z-axis component of the chronological data at the starting point and the endpoint is zero. The specifying unit 110 may recognize the starting point and the endpoint of the trace pattern based on this condition.

The specifying unit 110 can recognize the movement of the operator body part on the virtual input surface VS1 with reference to the value of the y-axis component of the chronological data on acceleration. For example, the specifying unit 110 calculates the sum of the absolute values of the y-axis component of the chronological data and compares the sum with an inclination reference value. The calculation and comparison can be made by an adder and a comparator. When determining that the sum is smaller than the inclination reference value, the specifying unit 110 determines that the operator body part is moved on the virtual input surface VS1. In other words, the specifying unit 110 determines that the virtual input surface is steeply inclined relative to the ground.

Similarly, in the case where that the operator body part is moved on the virtual input surface VS2, the z-axis component of the chronological data on acceleration is smaller than the x-axis component and the y-axis component of the data. The specifying unit 110 can recognize the movement of the operator body part on the virtual input surface VS2 with reference to the value of the z-axis component of the chronological data of acceleration. When the sum of the absolute values of the z-axis components is smaller than the inclination reference value, the specifying unit 110 determines that the operator body part is moved on the virtual input surface VS2. In other words, the specifying unit 110 determines that the virtual input surface is gently inclined relative to the ground.

The position of the operator body part is obtained by integrating acceleration twice, and thus, the inclination of the virtual input surface may be determined in the following manner. Firstly, the positions of the operator body part along the y axis are determined based on the value obtained by integrating acceleration twice. Then, the amount of the movement of the operator body part in the y-axis direction is calculated from the determined positions. The amount of the movement can be calculated as the longest distance between the individual positions along the y axis. When the amount of the movement along the y axis is smaller than a predetermined motion reference value, the specifying unit 110 determines that the operator body part is moved on the virtual input surface VS1. Similarly, when the amount of the movement along the z axis is smaller than a movement amount reference value, the specifying unit 110 determines that the operator body part is moved on the virtual input surface VS2.

In short, when the vertical value indicative of the amount of the movement of the operator body part in the y-axis direction is smaller than the predetermined reference value, the specifying unit 110 may determine that the vertical input surface is steeply inclined. When the horizontal value indicative of the amount of the movement of the operator body part in the z-axis direction is smaller than the predetermined reference value, the specifying unit 110 may determine that the virtual input surface is gently inclined.

Thus, the specifying unit 110 can determine the degree of the inclination of the virtual input surface. The information on the inclination is output to the luminance controller 120. The luminance controller 120 can control the luminance of the display 30 according to the inclination of the virtual input surface. In the case where the display 30 is a liquid crystal display panel, the luminance controller 120 controls the luminance of the backlight.

Figure 9:
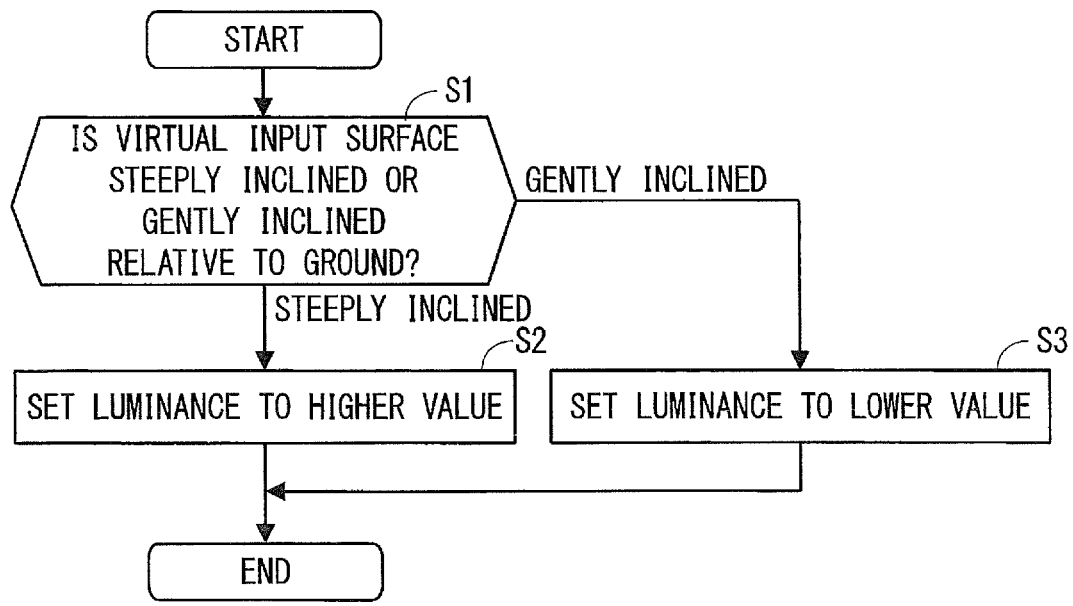
FIG. 9 illustrates a flowchart showing an example operation performed by a specifying unit and a luminance controller.

FIG. 9 illustrates a flowchart showing a specific example operation performed by the specifying unit 110 and the luminance controller 120. The operation illustrated in FIG. 9 is performed in response to the movement of the operator body part per input. The movement per input refers to the movement of the operator body part in the individual trace pattern. In the illustration of FIG. 9, the specifying unit 110 determines in Step S1 whether the virtual input surface is steeply inclined or gently inclined, in the above-mentioned manner or the like. The result of the determination is output to the luminance controller 120.

If it is determined in Step S1 that the virtual input surface is steeply inclined, in Step S2, the luminance controller 120 sets the luminance of the display 30 to a first value. If it is determined in Step S1 that the virtual input surface is gently inclined, in Step S3, the luminance controller 120 sets the luminance of the display 30 to a second value smaller than the first value.

The user can adjust the luminance according to the inclination of the virtual input surface. This means that the user can adjust the luminance with a simple motion.

In the above-mentioned example, the luminance controller 120 sets the luminance to the lower value in response to a movement on the gently inclined virtual input surface. This is preferable in terms of confidentiality of input, as will be described below.

Unlike the display contents of the display 30 having a high luminance, the display contents of the display 30 having a low luminance are less visible to a stranger. This is because a dark screen has poor visibility. Unlike the movement of the operator body part on the steeply inclined virtual input screen, the movement of the operator body part on the gently inclined virtual input screen is less visible to the stranger. One reason may be that it is difficult for most people to perceive the movement in the depth direction.

In one embodiment, when the user moves the operator body part in a less perceptible manner, the display 30 performs display at a luminance that is too low for a stranger to see the display contents. The user can thus perform an input operation under strict confidentiality.

When the virtual input surface is gently inclined, in Step S3, the luminance controller 120 may cause the display 30 to stop performing display. In other words, the luminance may be set to zero. Here, the luminance refers to the overall luminance of the display 30. In the case where the liquid crystal display panel is irradiated with light by a plurality of backlights, the luminance controller 120 may turn off all of the backlights to set the luminance to zero. This can enhance confidentiality.

In the above-mentioned example, the luminance has been changed in binary form in accordance with the binary information indicating that the virtual input surface is steeply inclined or gently inclined. Alternatively, the luminance may be changed minutely according to the inclination of the virtual input surface.

Figure 10:
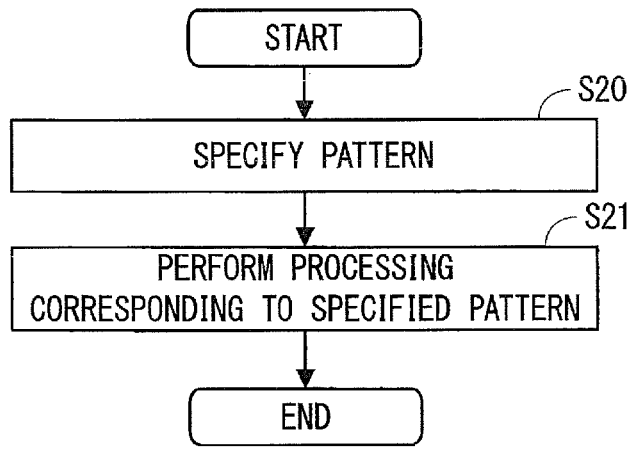
FIG. 10 illustrates a flowchart showing an example operation performed by the specifying unit and a processor.

The following will describe the input operation according to the trace pattern. FIG. 10 illustrates an example operation performed by the specifying unit 110 and the processor 130. The operation illustrated in FIG. 10 is performed, for example, subsequently to the operation illustrated in FIG. 9. In Step S20, the specifying unit 110 specifies, based on the motion information MD1, an input corresponding to the trace pattern on the virtual input surface. The specifying unit 110 may specify the input in any desired manner, which will be described below in outline.

With reference to FIG. 5, a plurality of pieces of registered pattern information SP1 are prestored in a storage 70. The storage 70 may be separate from the storage 103 or may be integral with the storage 103. The registered pattern information SP1 is the motion information based on the movement of the operator body part in a predetermined trace pattern. The operator body part is moved in the trace pattern corresponding to the registered pattern information SP1 on, for example, the virtual input surface VS1. For example, the y-axis component of acceleration corresponding to the registered pattern information SP1 is zero.

The specifying unit 110 specifies the trace pattern by comparing the motion information MD1 with the plurality of pieces of registered pattern information SP1 stored in the storage 70. Note that the differences between the virtual input surface associated with the registered pattern information SP1 and the virtual input surface associated with the motion information MD1 need to be accommodated before making such a comparison.

When determining that the operator body part is moved on the virtual input surface VS1, the specifying unit 110 directly compares the motion information MD1 with the plurality of pieces of registered pattern information SP1 based on the assumption that the virtual input surface associated with the motion information MD1 agrees with the virtual input surface associated with the registered pattern information SP1. Then, the specifying unit 110 specifies one of the plurality of pieces of registered pattern information SP1 that resembles the motion information MD1 most closely, with the degree of resemblance higher than a predetermined resemblance reference value. The degree of resemblance may be calculated in a given manner. For example, the degree of resemblance may be calculated by adding the absolute values of the differences between the individual values contained in the chronological data on the motion information MD1 and the individual values contained in the chronological data on the registered pattern information SP1. Specifically, the degree of resemblance may be obtained by adding up the sum total of the absolute values of the differences in the x-axis component, the sum total of the absolute values of the differences in the y-axis components, and the sum total of the absolute values of the differences in the z-axis components. The smaller the sum is, the higher the degree of resemblance is.

The y-axis component hardly affects the trace pattern on the virtual input surface VS1, and thus, it is not required that the y-axis components be taken into account in computing the degree of resemblance. This can facilitate the computation.

When determining that the operator body part has moved on the virtual input surface VS2, the specifying unit 110 converts the motion information MD1 on the virtual input surface VS2 to its equivalent on the virtual input surface VS1. For conversion, the x-axis component, the y-axis component, and the z-axis component of acceleration are regarded as the x-axis component, the z-axis component, and the y-axis component, respectively. Then, the specifying unit 110 specifies one of the plurality of pieces of registered pattern information SP1 that resembles the motion information MD1 obtained by the conversion, with the degree of resemblance higher than the predetermined resemblance reference value.

The specifying unit 110 can specify one of the plurality of pieces of registered pattern information SP1, or, the trace pattern in the above-mentioned manner. The specifying unit 110 also specifies the input that corresponds to the trace pattern and is input to the electronic apparatus 100. The input corresponding to the registered pattern information SP1 is also stored in, for example, the storage 70. The specifying unit 110 reads, from the storage 70, information on the input corresponding to the specified piece of registered pattern information SP1 and then outputs the information to the processor 130.

In Step S21, the processor 130 performs processing corresponding to the input specified by the specifying unit 110. That is, the processor 130 performs processing corresponding to the trace pattern of the movement of the operator body part. In the case where the specified input is an input to display predetermined information, the processor 130 displays the predetermined information on the display 30. More specifically, the processor 130 creates screen information containing the predetermined information and then outputs the screen information to the display 30. Upon receipt of the screen information, the display 30 displays the screen information. Thus, the display screen of the display 30 can be appropriately updated according to the movement of the operator body part.

As mentioned above, both the input corresponding to the trace pattern and the input associated with the luminance can be done in response to a single movement of the operator body part of the user. These inputs may be done by making the simple movement, instead of making different movements for different inputs.

The following will describe an example of processing the input corresponding to the trace pattern in the case where the display 30 has stopped performing display in Step S3. For example, when the backlight is turned off, the display 30 stops performing display. In this case, the display 30 fails to display the predetermined information contained in the input corresponding to the trace pattern. Thus, the processor 130 may update the screen information which is to be displayed on the display 30 based on the predetermined information and cause the storage 103 to store the updated screen information. When the display 30 is controlled to perform display at a high luminance in Step S2 in response to the movement of the operator body part on the steeply inclined virtual input surface, the processor 130 may read the latest screen information from the storage 103 and display the information on the display 30.

Assume that the user inputs text information to be included in the body of an email message. Specifically, the user who has already input "Goo", which is a part of the phrase "Good morning.", as the text information in the body of the email message now inputs "d" on the gently inclined virtual input surface. The display 30 stops performing display in response to the movement on the gently inclined virtual input surface (Step S3). The input text information is not displayed accordingly. The processor 130 updates the screen information based on the text information and then stores the updated screen information. This text information is incorporated in the body of the email message contained in the screen information. The body of the email message in the screen information includes the text information indicative of "Good". The processor 130 may update the screen information every time the user inputs the text information on the gently inclined virtual input surface. For example, the user inserts a space and then inputs "m". The text information indicative of "Good m" is accordingly incorporated in the body of the email message in the screen information.

The user can input and see the text information in the body of the email message on the display 30 at the same time by moving the operator body part on the steeply inclined virtual input surface. The luminance controller 120 sets the luminance to the higher value, and the processor 130 displays the latest screen information on the display 30. For example, in response to the user's input of "o" on the steeply inclined virtual input surface, the luminance controller 120 sets the luminance to the higher value and the processor 130 displays, on the display 30, the screen information indicative of the body of the email message containing "Good mo".

As mentioned above, when the user moves the operator body part on the gently inclined virtual input surface, the display 30 may stop performing display, thereby enhancing confidentiality. In this state, the user can continue to input the predetermined information by moving the operator body part. The user can see the input predetermined information by moving the operator body part on the steeply inclined virtual input surface. The screen information into which the predetermined information is incorporated can be visually checked on the display 30.

It is not always required that the screen information be updated every time the user inputs the predetermined information. Several updates may be conducted in response to a movement of the operator body part on the steeply inclined virtual input surface. For example, together with the input of "o" on the steeply inclined virtual input surface, the information including "d", a space, and "m", which have been previously input on the gently inclined virtual input surface and stored, may be incorporated into the screen information.

In the above-mentioned specific example, the registered pattern information SP1 associated with the virtual input surface VS1 has been stored. Alternatively, the motion information on the trace pattern associated with the virtual input surface VS1 and the motion information on the trace pattern associated with the virtual input surface VS2 may be prestored as the registered pattern information SP1. This eliminates the need for converting the virtual input surface associated with the motion information MD1. In this case, the motion information MD1 is compared with the registered pattern information SP1 to specify one of the plurality of pieces of registered pattern information SP1 that resembles the motion information MD1 the most. Both the virtual input surface and the trace pattern can be specified accordingly.

Figure 11:
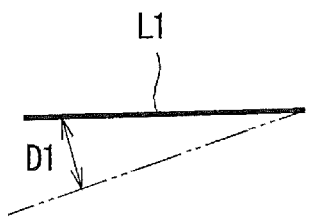
FIG. 11 schematically illustrates an example of the relationship between the trace of the operator body part and a virtual surface.

The above-mentioned virtual input surface can be defined as will be described below. The relationship between the trace of the operator body part and a virtual surface will be firstly described. When the user writes characters and numbers or draws signs and graphics on a virtual surface by moving the operator body part, the trace of the operator body part is included in the virtual surface in theory. This means that, in theory, the distance between the trace and the virtual surface is equal to zero. With reference to FIG. 11, the virtual surface (see the alternate long and two short dashes line) can be regarded as the surface (referred to as a "minimum distance surface") that yields the smallest possible sum of distances D1, which are distances between the relevant surface and the individual points of a trace L1 of the operator body part.

Here, the inclination of the virtual input surface is specified. The parallel surfaces have the same degree of inclination. Thus, the virtual input surface may be defined as the surface parallel to the minimum distance surface.

The specifying unit 110 and the luminance controller 120 do not need to recognize the virtual input surface. For example, the luminance may be merely adjusted as mentioned above in such a manner that the luminance in the state in which the amount of the movement of the operator body part along the y axis is greater than the reference value becomes higher than the luminance in the state in which the amount of the movement of the operator body part along the z axis is greater than the reference value. That is, the virtual input surface does not need to be specified in actuality.

Second Embodiment

Figure 12:
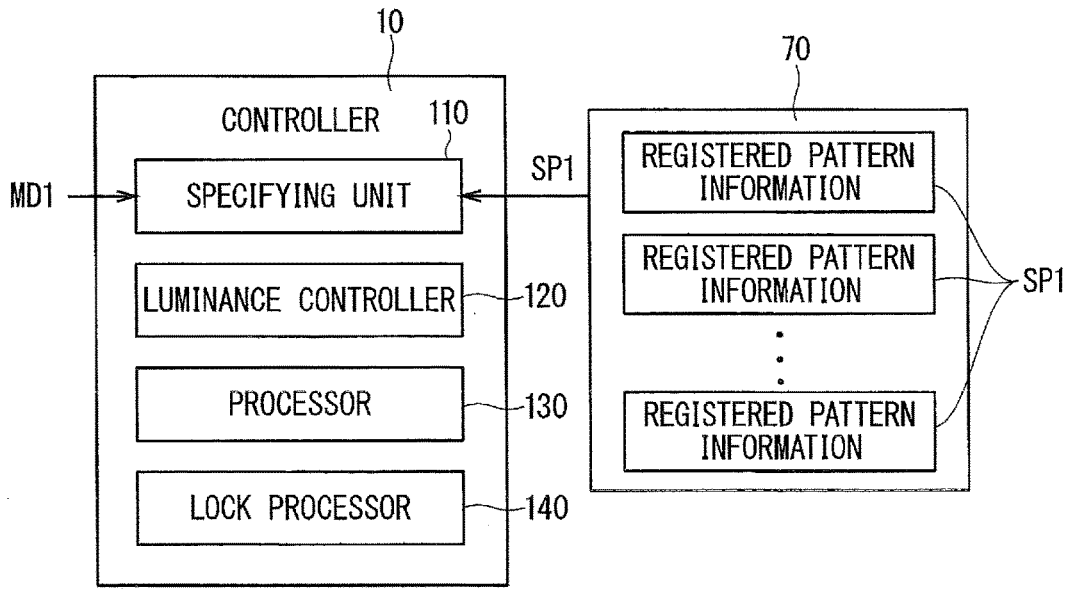
FIG. 12 schematically illustrates an example of the internal configuration of the controller.

The electronic apparatus system according to a second embodiment is similar to the electronic apparatus system illustrated in FIG. 1. FIG. 12 illustrates a functional block diagram schematically showing an example of the internal configuration of the controller 10. The controller 10 includes a lock processor 140 in addition to the constituent components of the controller 10 illustrated in FIG. 5.

The lock processor 140 can restrict operations to be performed on the operation unit when the following conditions are met. The restriction may affect the touch panel 50 and/or the operation key 5. Here, the lock processor 140 restricts operations performed on the touch panel 50. The restriction is also referred to as a lock hereinafter. The lock means disabling a predetermined operation on the operation unit. For example, operations other than the lock release input are disabled. For example, in response to a release operation on the touch panel 50, the lock processor 140 unlocks the touch panel 50.

Figure 13:
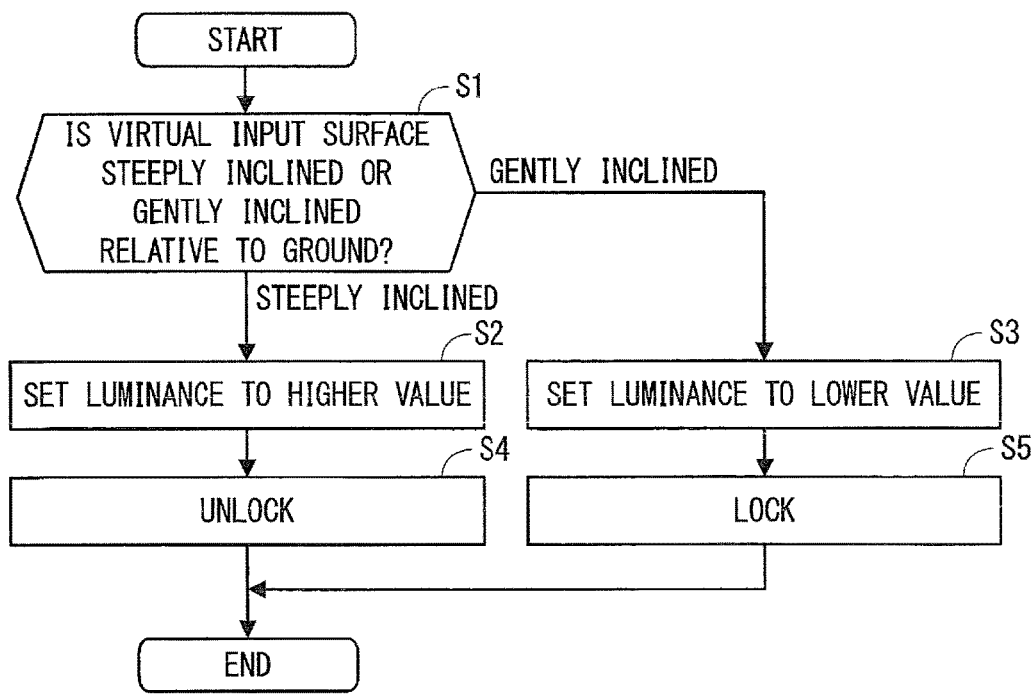

FIG. 13 illustrates a flowchart showing an example operation performed by the controller 10. In addition to the steps of the flowchart illustrated in FIG. 9, Steps S4 and S5 are included in the flowchart illustrated in FIG. 13. When it is determined in Step S1 that the virtual input surface is gently inclined, the lock processor 140 performs a lock processing in Step S5 subsequent to Step S3. In the case where the touch panel 50 is in the lock state immediately before Step S5, the lock processor 140 does not need to perform the lock processing again in Step S5. Steps S3 and S5 may be performed in reverse order.

If it is determined in Step S1 that the virtual input surface is steeply inclined, the lock processor 140 releases the lock in Step S4 subsequent to Step S2. In the case where the touch panel 50 is not in the lock state immediately before Step S4, the lock processor 140 does not need to perform the release processing in Step S4. Steps S2 and S4 may be performed in reverse order.

The user can remotely operate the electronic apparatus 100 through the use of the wearable input apparatus 200. In this case, however, it is sometimes difficult for the user to stop the stranger from operating the electronic apparatus 100. The lock processor 140 can perform the lock processing according to the inclination of the virtual input surface. Thus, when being away from the electronic apparatus 100, the user can easily restrict the operation of the stranger on the touch panel 50.

The lock processor 140 performs the lock processing in response to the movement of the operator body part on the gently inclined virtual input surface. This means that the operation of the stranger on the touch panel 50 is restricted while the user performs an input on the virtual input surface that is less visible to the stranger. This can enhance confidentiality.

Restrictions on the operation on the touch panel 50 are removed in response to the movement of the operator body part on the steeply inclined operator body part. The lock is released when the user performs an input on the virtual input surface that is more visible to the stranger. The user can accordingly perform an input while visually checking the display 30.

The operations other than the release input operation performed through the use of operation unit have been disabled. Alternatively, all of the operations performed through the use of the operation unit may be disabled. In this case, the user can release the lock through the wearable input apparatus 200. All of the operations are disabled, and thus, an operation of the stranger on the electronic apparatus 100 is disabled. This can further enhance confidentiality.

Third Embodiment

The electronic apparatus system according to a third embodiment is similar to the electronic apparatus system illustrated in FIG. 1. An example of the internal configuration of the controller 10 is similar to the configuration illustrated in FIG. 12.

In the third embodiment, the lock processor 140 performs the lock processing and releases the lock when conditions that are different from the conditions in the second embodiment are met. The lock processor 140 locks the operation unit (e.g., the touch panel 50 in this case) when determining that no operation has been performed through the use of the touch panel 50 and the operation key 5 for a predetermined period of time. The lock processor 140 can make such a determination using a timer circuit, which measures the period of time over which no input has been performed.

The lock processor 140 may lock the touch panel 50 in response to the user's operation on the operation key 5 that is assigned to the lock processing.

The lock processor 140 may perform the lock processing when the operator body part moves at a speed greater than a predetermined value due to a collision with an external object. Such a determination can be made based on, for example, the magnitude relationship between the acceleration and the predetermined value.

In short, the lock processor 140 in the third embodiment can perform the lock processing based on the condition other than the inclination of the virtual input surface.

The lock processor 140 releases the lock in response to the lock release input to the touch panel 50. The lock release input means, for example, the input of a password for releasing the lock through the use of the touch panel 50. Specifically, the lock processor 140 determines whether the password input through the use of the touch panel 50 coincides with the lock release password. If a determination is positive, the lock is released.

The lock release input may be an operation pattern for releasing the lock through the use of the touch panel 50. The operation pattern means the trace of an operator moved on the display area 2a. The operation pattern is detected by the touch panel 50. The lock processor 140 determines whether the operation pattern input through the use of the touch panel 50 coincides with the operation pattern for releasing the lock. If a determination is positive, the lock is released.

In the third embodiment, the user can input the password or the operation pattern by moving the operator body part, instead of operating the touch panel 50. When inputting the password, the user moves the operator body part on the predetermined virtual input surface in a manner to indicate the start of the input of the password, to input elements (characters or numbers) included in the password one by one, and to indicate the end of the input of the password.

Based on the motion information MD1, the specifying unit 110 specifies the degree of inclination of the virtual input surface with respect to the above-mentioned movement and also specifies the inputs indicated by the above-mentioned movement as the start of input, the individual elements of the password, and the end of input. The inclination of the virtual input surface and the inputs are output to the lock processor 140. The lock processor 140 can recognize the input password accordingly.

Similarly, the user can move the operator body part in a manner to input the operation pattern for releasing the lock. For example, the user moves the operator body part on the predetermined virtual input surface in a manner to indicate the start of the input of the operation pattern, to trace the operation pattern, and to indicate the end of the input of the operation pattern (e.g., to keep the operator body part at the same position for a predetermined period of time).

Based on the motion information MD1, the specifying unit 110 specifies the degree of inclination of the virtual input surface with respect to the above-mentioned movement and also specifies the inputs indicated by the above-mentioned movement as the start of input, the input of the operation pattern, and the end of input. The inclination of the virtual input surface and the inputs are output to the lock processor 140. The lock processor 140 can recognize the input operation pattern accordingly.

The lock processor 140 accepts the lock release input (such as a password or an operation pattern) done by moving the operator body part, as mentioned above. However, the lock processor 140 may disable the lock release input depending on the inclination of the virtual input surface. Specifically, if the virtual input surface is steeply inclined, the lock processor 140 does not accept the lock release input that has been done by moving the operator body part. If the virtual input surface is gently inclined, the lock processor 140 accepts the lock release input that has been done by moving the operator body part.

Figure 14:
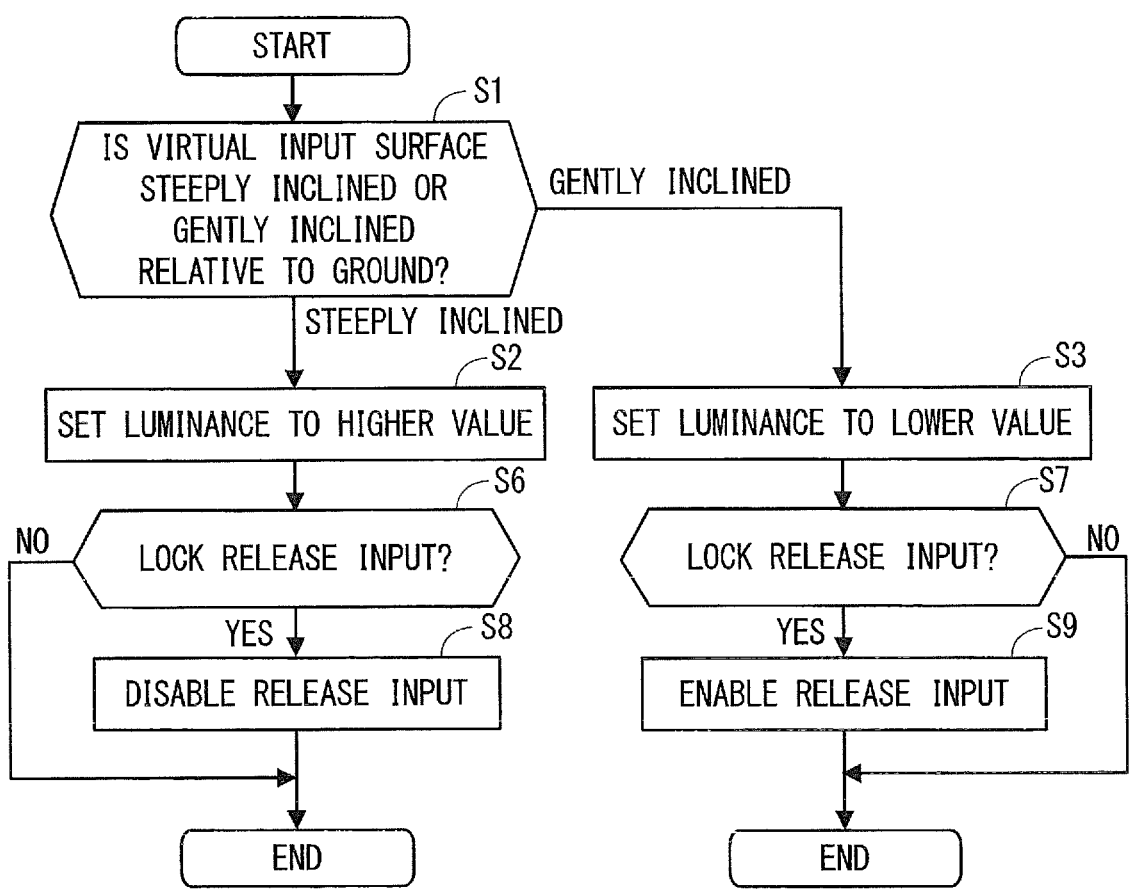

FIG. 14 illustrates a flowchart showing an example of the specific operation performed by the specifying unit 110, the luminance controller 120, and the lock processor 140. Steps S1 to S3 of FIG. 14 are identical to Steps S1 to S3 of FIG. 9.

In Step 6 subsequent to Step S2, the specifying unit 110 determines whether the input that has been done by moving the operator body part is the lock release input (e.g., the input of a password or the input of an operation pattern). If a determination is negative in Step S6, the operation is ended. If a determination is positive, in Step S8, the lock processor 140 disables the lock release input that has been done by moving the operator body part. In the case where the virtual input surface is steeply inclined, the lock is not released in response to the lock release input that has been done properly.

Subsequent to Step S3, Step S7 identical to Step S6 is performed. If a determination is negative in Step S7, the operation is ended. If a determination is positive, in Step S9, the lock processor 140 enables the lock release input that has been done by moving the operator body part. The lock processor 140 releases the lock in response to the lock release input that has been done properly.

In the case where the virtual input surface is steeply inclined, the lock processor 140 disables the lock release input that has been done by moving the operator body part, as mentioned above. When the lock release input is done on the virtual input surface that is more visible to the stranger, the lock processor 140 does not release the lock. It is thus not revealed, to the stranger who has perceived the movement of the operator body part, that the operator body part has been moved to release the lock.

When the operator body part is moved on the gently inclined virtual input surface to release the lock, the lock processor 140 enables the lock release input done by moving the operator body part. When the lock release input is done on the virtual input surface on which the movement is less perceptible to the stranger, the lock processor 140 releases the lock. Thus, the user can release the lock without anyone else knowing that the user is moving the operator body part in order to release the lock.

Fourth Embodiment

In the second and third embodiments, the touch panel 50 has been locked when the respective conditions are met. The lock operation performed upon satisfaction of the condition in the second embodiment is referred to as a primary lock. The lock operation performed upon satisfaction of the condition in the third embodiment is referred to as a secondary lock. The primary lock and the secondary lock are applicable to a fourth embodiment. The first and secondary locks may be simply referred to as a lock when there is no need to distinguish between them.

The electronic apparatus system according to the fourth embodiment is similar to the electronic apparatus system illustrated in FIG. 1. An example of the internal configuration of the controller 10 is similar to the configuration illustrated in FIG. 12.

For example, the lock processor 140 releases the primary lock both in the case where the lock release input (e.g., the input of a password or the input of an operation pattern) has been properly done by operating the operation unit (e.g., the touch panel 50) or by moving the operator body part and in the case where the virtual input surface is steeply inclined as in the second embodiment.

The secondary lock is released by the lock processor 140 in the case where the lock release input has been properly performed by operating the operation unit or by moving the operator body part as in the third embodiment. The lock release input is applicable to both the primary lock and the secondary lock. This means that the primary lock and the secondary lock are released in response to one lock release input.

FIG. 15 illustrates a flowchart showing an example of the specific operation performed by the specifying unit 110, the luminance controller 120, and the lock processor 140. Steps S1 to S3 of FIG. 15 are identical to Steps S1 to S3 of FIG. 9.

If it is determined in Step S1 that the virtual input surface is steeply inclined, the lock processor 140 releases the primary lock in Step S4' subsequent to Step S2. In the case where the virtual input surface is steeply inclined, the movement of the operator body part is more visible to the stranger and it is almost useless concealing the input. The primary lock becomes unnecessary, and thus, the primary lock is released as in the second embodiment.

Then, in Step S6', the specifying unit 110 determines whether the input that has been done by moving the operator body part is the lock release input, as in Step S6 in the third embodiment. If a determination is negative in Step S6', the operation is ended. If a determination is positive, the lock processor 140 disables the lock release input in Step S8'. In the case where the virtual input surface is steeply inclined, the secondary lock is not released in response to the lock release input that has been done properly. Thus, the fact that the movement of the operator body part is the lock release input is concealed from the stranger who has perceived the relevant movement.

If it is determined in Step S1 that the virtual input surface is gently inclined, the lock processor 140 applies the primary lock in Step S5' subsequent to Step S3, as in the second embodiment. In the case where the virtual input surface is gently inclined, the movement of the operator body part is relatively less perceptible to the stranger. It is thus imperative for the user to conceal the input, and the lock processor 140 applies the primary lock accordingly.

Subsequent to Step S5', Step S7' identical to Step S6' is performed. If a determination is negative in Step S7', the operation is ended. If a determination is positive, in Step S9', the lock processor 140 enables the lock release input, as in the third embodiment. The lock processor 140 releases the primary lock and the secondary lock in response to the lock release input that has been done properly.

In the case where the virtual input surface is gently inclined, the primary lock is also released in response to the lock release input that has been consciously done by the user. The primary lock and the secondary lock are released in response to the lock release input done on the virtual input surface on which the movement is less perceptible to the stranger. Thus, the user can release the locks without anyone else knowing it.

Step S2, Step S4', and the combination of Steps S6' and S8' may be performed in any desired order. Step S3 and the combination of Steps S5', S7', and S9' may be performed in any desired order.

Fifth Embodiment

The electronic apparatus system according to a fifth embodiment is similar to the electronic apparatus system illustrated in FIG. 1. An example of the internal configuration of the controller 10 is similar to the configuration illustrated in FIG. 12. In the fifth embodiment as well, the user inputs the lock release password by moving the operator body part on the virtual input surface.

Figure 16:
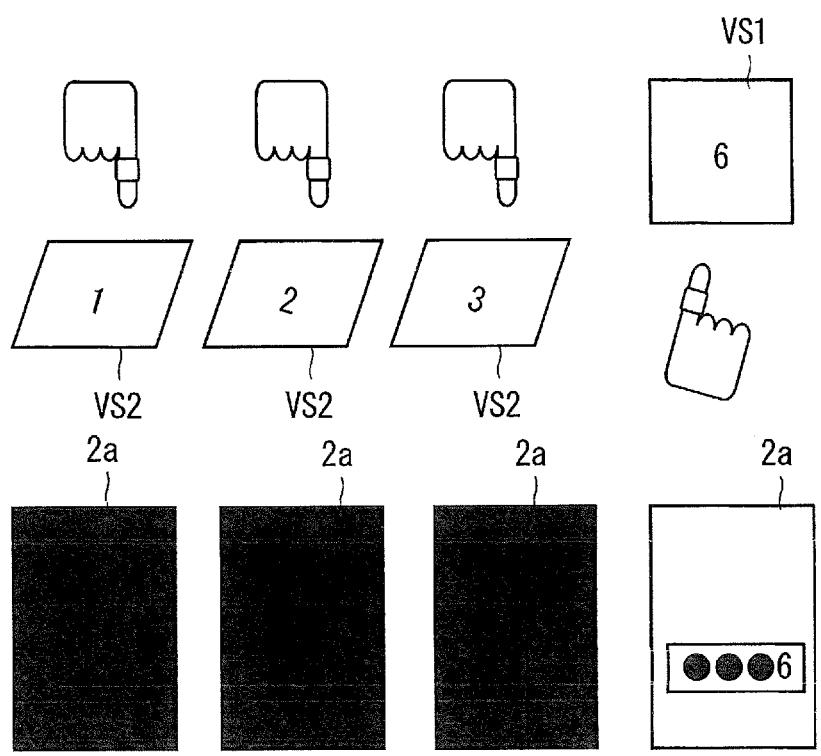
FIG. 16 schematically illustrates an example of the relationship between the movement of the operator body part and a display screen on a display area.

In the fifth embodiment, the user inputs elements (characters or numbers) included in the password by moving the operator body part on the different virtual input surfaces. As illustrated in FIG. 16, out of the numbers included in the password "1236", the user inputs "1", "2", and "3" by moving the operator body part on the gently inclined virtual input surface VS2 and inputs "6" by moving the operator body part on the steeply inclined virtual input surface VS1.

Based on the motion information MD1, the specifying unit 110 specifies the inclination of the virtual input surface with respect to the above-mentioned movement and also specifies, as the individual elements of the password, an input corresponding to the trace pattern of the above-mentioned movement. The inclination of the virtual input surface and the elements of the password are output to the lock processor 140 one by one.

The lock processor 140 determines whether to display, on the display 30, each of the elements of the password that have been input one by one based on the inclination of the corresponding one of the virtual input surfaces. FIG. 16 schematically illustrates an example of the relationship between the movement of the operator body part for inputting the password and the relevant display screen on the display area 2a. The lock processor 140 does not display the password when the user moves the operator body part on the gently inclined virtual input surface VS2 to input the individual element of the password. In the illustration of FIG. 16, the displaying is ended in the display area 2a (the display 30 stops performing display), so that the elements of the password are not displayed.

In the illustration of FIG. 16, the user moves the operator body part to indicate "6", which is the final element of the password, on the steeply inclined virtual input surface VS1. When the user moves the operator body part on the steeply inclined virtual input surface VS1 to input the individual element of the password, the lock processor 140 displays, on the display 30, the individual element that has been input on the steeply inclined virtual input surface VS1 without displaying the individual element itself that has been input on the gently inclined virtual input surface VS2. In the illustration of FIG. 16, the elements "1", "2", and "3" themselves are not displayed and are each represented by a mark "●", which is information different from the element itself. The password as a whole is represented by "●●●6". The mark "●" is one of the symbols used to hide sensitive information.

When the operator body part is moved on the virtual input surface VS2, on which the movement of the operator body part is less perceptible, the password is displayed, with the input elements themselves being kept confidential, as mentioned above. The user may input confidential elements on the gently inclined virtual input surface VS2, whereas the user may input, on the steeply inclined virtual input surface VS1, elements which are to be checked in visual form on the display 30. This offers advantages to the user in inputting the password.

In the illustration of FIG. 16, the input element is represented by the symbol that is typically used to hide sensitive information. Alternatively, information different from the input element may be displayed. When an element "123" is input, this element may be represented by different information, such as "234". In this case as well, the correct password is kept confidential.

Figure 17:
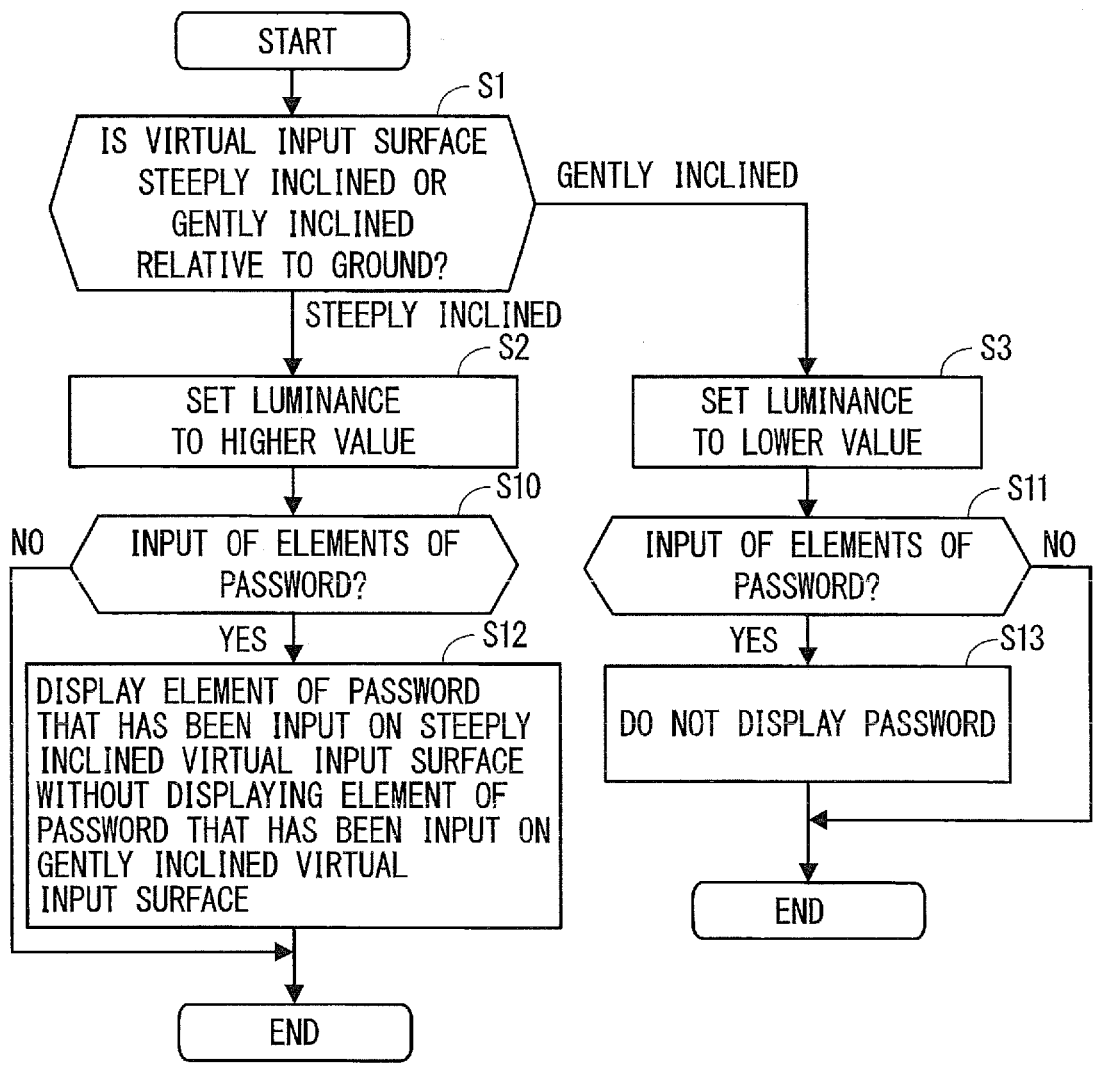
FIG. 17 illustrates a flowchart showing an example operation performed by the controller.

FIG. 17 illustrates a flowchart showing an example of the above-mentioned operation. Steps S1 to S3 of FIG. 17 are identical to Steps S1 to S3 of FIG. 9. When determining in Step S1 that the virtual input surface is steeply inclined, the specifying unit 110 determines, in Step S10 subsequent to Step S2, whether the input corresponding to the trace pattern of the operator body part is the input of elements of the password. For example, in a case where the operator body part has already been moved to start inputting the password and the operator body part has not been moved to finish inputting the password yet, the specifying unit 110 determines that the relevant input is the input of the elements of the password.

If a determination is negative in Step S10, the operation is ended. If a determination is positive in Step S10, in Step S12, the lock processor 140 displays, on the display 30, the individual element of the password that has been input on the steeply inclined virtual input surface without displaying, on the display 30, the individual element of the password that has been input on the gently inclined virtual input surface.

If it is determined in Step S1 that the virtual input surface is gently inclined, Step S11 identical to Step S10 is performed subsequent to Step S3. If a determination is negative in Step S11, the operation is ended. If a determination is positive, in Step S13, the lock processor 140 does not display the input password on the display 30. In Step S3, the luminance controller 120 may set the luminance to zero, and the display 30 may stop performing display accordingly. In this case, Steps S11 and S13 are not necessary.

Step S2 and the combination of Steps S10 and S12 may be performed in reverse order. Step S3 and the combination of Steps S11 and S13 may be performed in reverse order.

The fifth embodiment is applicable to not only the lock processing but also other types of display processing. In a case where first information is included in a first input corresponding to a first movement of the operator body part on the gently inclined virtual input surface, the first information is not displayed. In a case where display of second information is included in a second input corresponding to a second movement of the operator body part on the steeply inclined virtual input surface, the second information is displayed and the first information input on the gently inclined virtual input surface is not displayed. When there is no display of the first information, the first information itself is not displayed, whereas third information different from the first information (e.g., a sign indicating that an input has been done) may be displayed.

Sixth Embodiment

Figure 18:
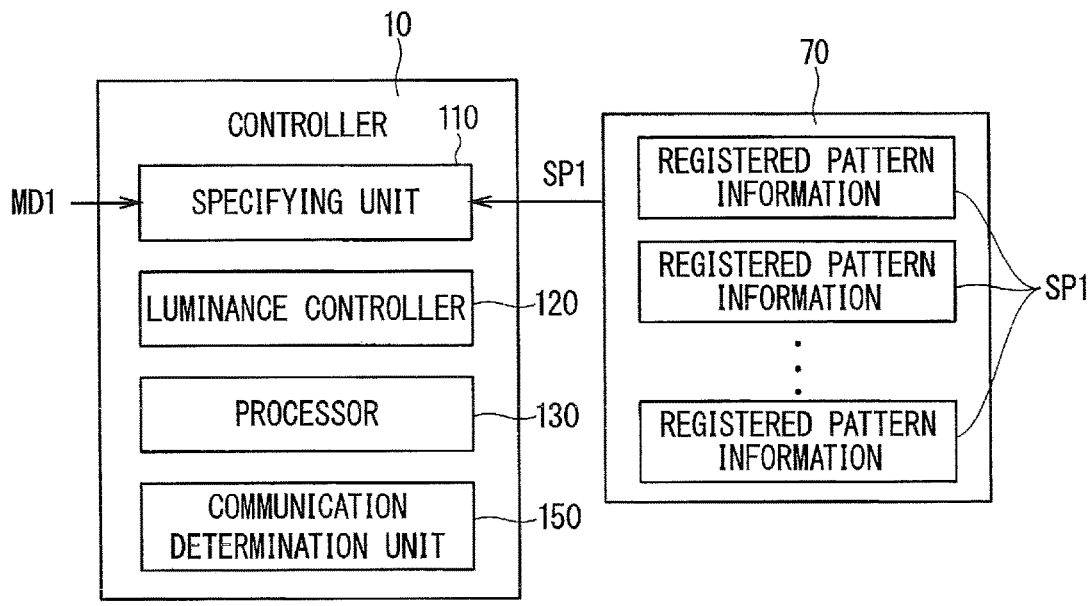
FIG. 18 schematically illustrates an example of the internal configuration of the controller.

The electronic apparatus system according to a sixth embodiment is similar to the electronic apparatus system illustrated in FIG. 1. FIG. 18 illustrates a functional block diagram schematically illustrating an example of the internal configuration of the controller 10. The controller 10 includes a communication determination unit 150 in addition to the constituent components of the controller 10 illustrated in FIG. 5.

The communication determination unit 150 can calculate, based on a signal received from the wearable input apparatus 200, a value indicating the quality of communication between the wearable input apparatus 200 and the electronic apparatus 100 (a value equivalent to the communication value of a means to solve the problems) and determine whether the value is greater than a predetermined communication reference value. Here, the reception strength of the received signal (e.g., electric power) may be calculated. The communication determination unit 150 determines whether the reception strength is greater than a predetermined reception reference value. The reception strength decreases with increasing distance between the electronic apparatus 100 and the wearable input apparatus 200. The reception strength may be weakened by a barrier located between the electronic apparatus 100 and the wearable input apparatus 200. The determination result associated with the magnitude relation between the reception signal and the reception reference value is output to the luminance controller 120.

Figure 19:
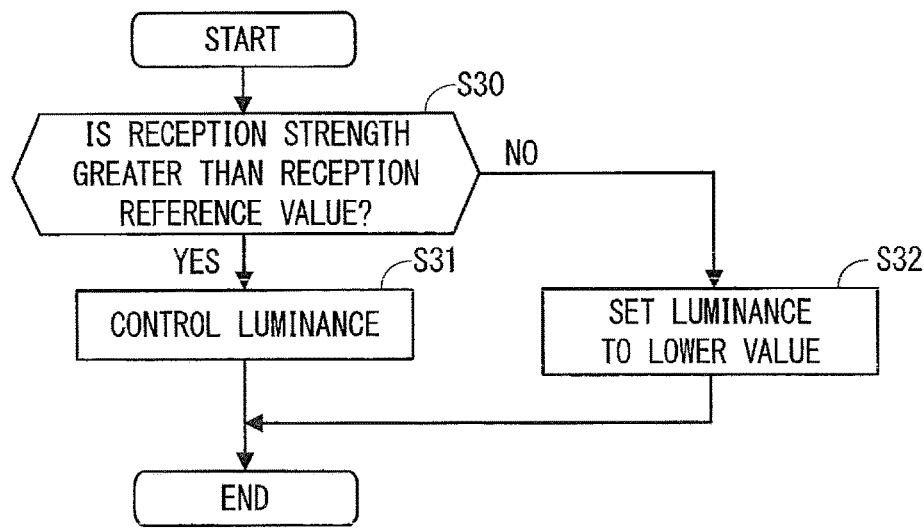
FIG. 19 illustrates a flowchart showing an example of the operation performed by the controller.

FIG. 19 illustrates a flowchart showing an example of the specific operation performed by the controller 10. The wearable input apparatus 200 transmits a signal to the electronic apparatus 100 at predetermined intervals. For example, the operation of FIG. 19 is performed every time the electronic apparatus 100 receives a signal from the wearable input apparatus 200. In Step S30, the communication determination unit 150 determines whether the reception strength is greater than the reception reference value, as mentioned above. If a determination is positive in Step S30, in Step S31, the controller 10 controls the luminance as mentioned in the first embodiment. That is, the controller 10 controls the luminance of the display 30 according to the inclination of the virtual input surface.

If a determination is negative in Step S30, in Step S32, the luminance controller 120 sets the luminance of the display 30 to the lower value. For example, the luminance may be set to zero.

As mentioned above, the luminance of the display 30 is reduced in the case where the electronic apparatus 100 is at a great distance from the use or in the case where a barrier is located between the electronic apparatus 100 and the user. In such a case, it is conceivable that the user will not directly operate the electronic apparatus 100, and thus, the luminance is decreased such that the display 30 becomes less visible to the stranger.

Unlike Step S32 in FIG. 19 that is repeatedly performed as long as the reception strength is smaller than the reception reference value, Step S32 in some embodiments may be performed at a switch from the state in which the reception strength is greater than the reception reference value to the state in which the reception strength is smaller than the reception reference value. This switch can be detected in the following manner. For example, the communication determination unit 150 may store the reception strength in advance. In the case where the previous reception strength is greater than the reception reference value and the current reception strength is smaller than the reception reference value, the communication determination unit 150 may detect the switch.

When the user operates the operation unit or moves the operator body part to perform an input operation for increasing the luminance of the display in the state in which the reception strength is smaller than the reception reference value, the user's input operation is enabled.

Conversely, the luminance controller 120 may set the luminance of the display 30 to the higher value at a switch from the state in which the reception strength is smaller than the reception reference value to the state in which the reception strength is greater than the reception reference value. When the user moves the operator body part on the virtual input surface in the state in which the reception strength is greater than the reception reference value, the luminance is controlled in Step S31 according to the inclination of the virtual input surface.

Figure 20:
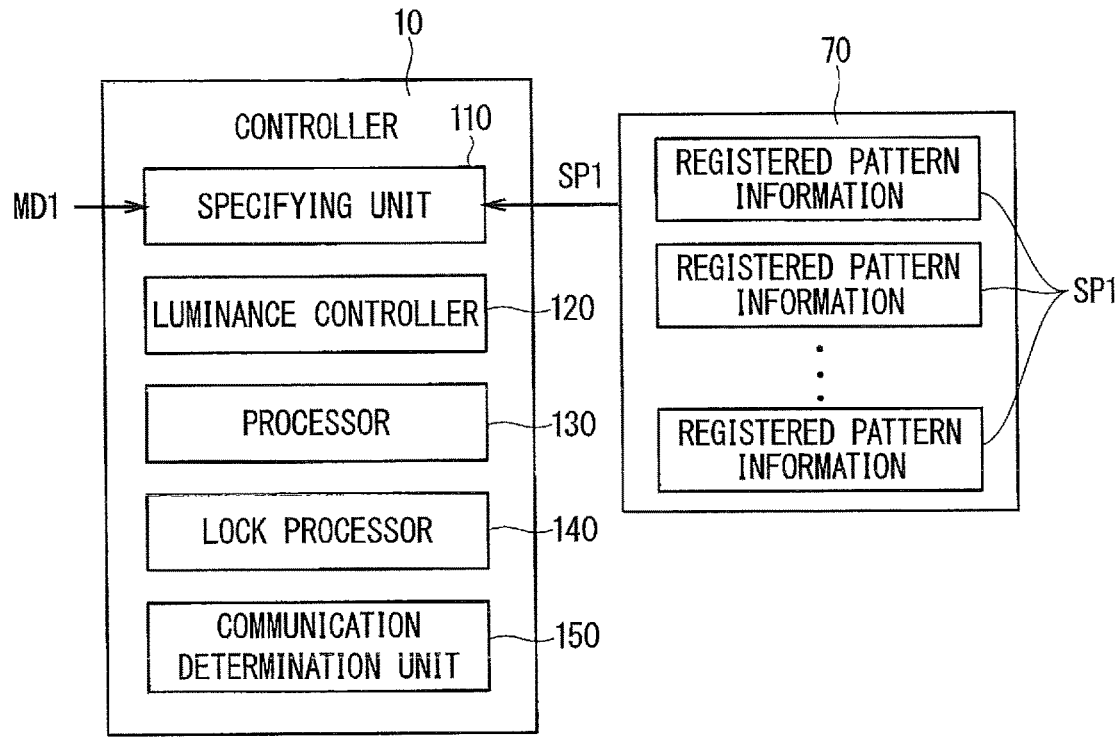
FIG. 20 schematically illustrates an example of the internal configuration of the controller.
Figure 21:
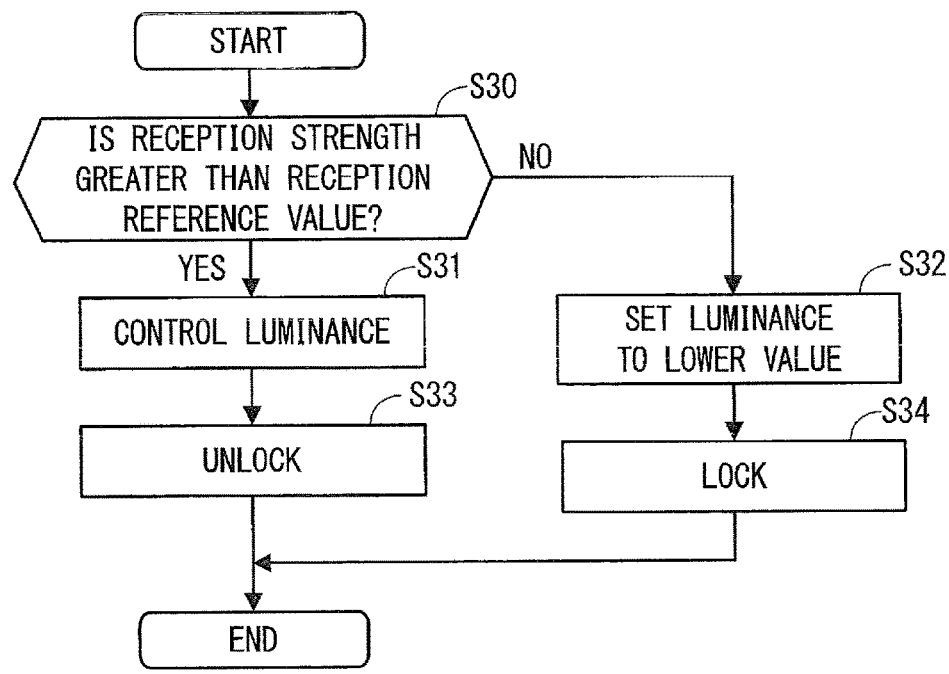
FIG. 21 illustrates a flowchart showing an example operation performed by the controller.

FIG. 20 illustrates a functional block diagram schematically showing an example of the internal configuration of the controller 10. The controller 10 includes the lock processor 140 in addition to the constituent components of the controller 10 illustrated in FIG. 18. FIG. 21 illustrates a flowchart showing an example of the specific operation performed by the controller 10. In addition to the steps of the flowchart illustrated in FIG. 19, Steps S33 and S34 are included in the flowchart illustrated in FIG. 21. If a determination is negative in Step S30, the lock processor 140 applies a lock to the operation unit in Step S34 subsequent to Step S32. In the sixth embodiment, the lock operation is also performed when the communication quality is low. Steps S32 and S34 may be performed in reverse order.

If a determination is positive in Step S30, in Step S33 subsequent to Step S31, the lock processor 140 releases the lock that has been applied on the basis of the low communication quality. Steps S31 and S33 may be performed in reverse order.

The user can accordingly restrict the stranger's operation on the electronic apparatus 100 in the state in which the user is at a great distance from the electronic apparatus 100 or a barrier is located between the user and the electronic apparatus 100. Also, the user can accordingly unlock the electronic apparatus 100 in the state in which the user is close to the electronic apparatus 100 or no barrier is located between the user and the electronic apparatus 100. In the case where the user cannot easily stop the stranger from operating the electronic apparatus 100, the user can restrict the stranger's operation.

It is not always required that Step S34 be repeatedly performed as long as the reception strength is smaller than the reception reference value. Step S34 may be performed at a switch from the state in which the reception strength is greater than the reception reference value to the state in which the reception strength is smaller than the reception reference value. In the state in which the reception strength is smaller than the reception reference value, the lock processor 140 may release the lock applied in Step S34 in response to a correct lock release input that has been done by moving the operator body part. This offers advantages to the user in releasing the lock.

Step S32, which is included in the illustration of FIG. 21, may be omitted.

The following will describe lock conditions and lock release conditions associated with both the primary lock, which is to be applied upon completion of the condition mentioned in the second embodiment, and the secondary lock, which is to be applied upon completion of the condition mentioned in the third embodiment. Here, the lock applied in Step S34 of FIG. 21 is referred to as a tertiary lock.

(i) The primary lock is applied upon completion of a first lock condition that the virtual input surface is gently inclined, as described in the second embodiment. (iii) The tertiary lock is applied upon completion of a third lock condition that the communication quality is lower than the communication reference value, as mentioned above. (ii) The secondary lock is applied upon completion of a second lock condition (e.g., the absence of input operation over a predetermined period of time) different from the first lock condition and the third lock condition.

The lock release conditions are now described. (I) Both the primary lock and the tertiary lock can be released in response to a lock release input that has been properly done by moving the operator body part or operating the operation unit. (II) The primary lock alone can be released upon completion of the lock release condition that the virtual input surface is steeply inclined. (III) The tertiary lock alone can be released upon completion of the lock release condition that the communication quality is high.

Figure 22:
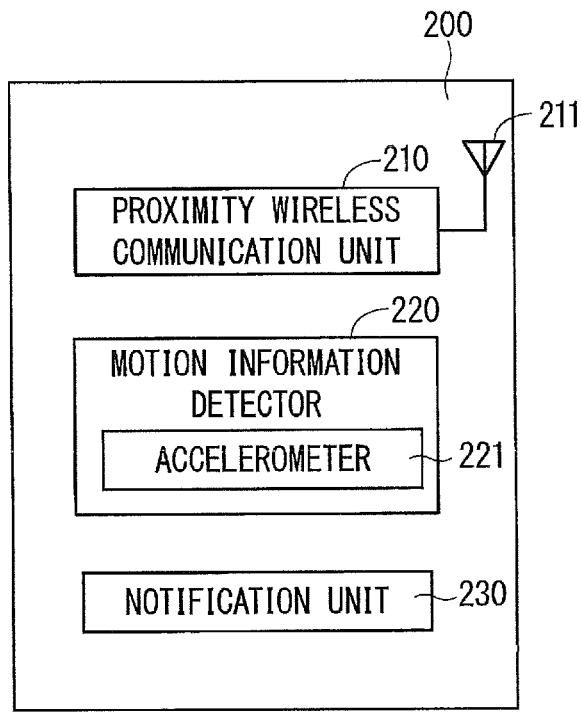
FIG. 22 schematically illustrates an example of the internal configuration of the controller.

FIG. 22 schematically illustrates an example configuration of the wearable input apparatus 200. The wearable input apparatus 200 includes a notification unit 230 in addition to the constituent components illustrated in FIG. 2. The notification unit 230 is, for example, a vibrator, a sound output unit, or a display, and can provide notification to the user.

Figure 23:
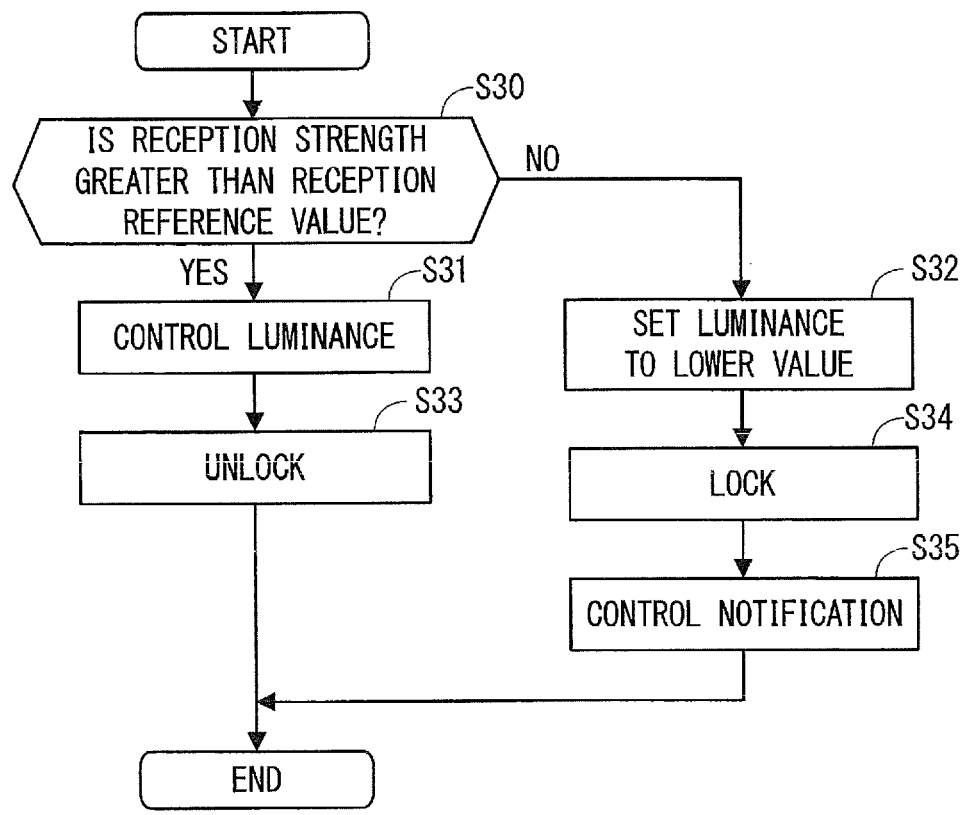
FIG. 23 illustrates a flowchart showing an example operation performed by the controller.

FIG. 23 illustrates a flowchart showing an example operation performed by the controller 10 and the notification unit 230. In addition to the steps of the flowchart illustrated in FIG. 21, Step S35 is included in the flowchart illustrated in FIG. 23. In Step S35 subsequent to S34, the controller 10 transmits, to the wearable input apparatus 200 through the proximity wireless communication unit 22, a command signal for causing the notification unit 230 to provide notification. When the wearable input apparatus 200 receives the signal, the notification unit 230 provides notification to the user. In the case where the notification unit 230 is a vibrator, the notification unit 230 provides notification to the user by vibrating in a predetermined vibration pattern. In the case where the notification unit 230 is a display, the notification unit 230 displays predetermined contents corresponding to the signal. In the case where the notification unit 230 is a sound output unit, the notification unit 230 outputs a predetermined sound (e.g., voice).

The user accordingly becomes aware that the luminance has been reduced and that a lock has been applied.

It is not always required that Step S35 be performed repeatedly as long as the reception strength is smaller than the reception reference value. Step S35 may be performed over a predetermined period of time after a switch from the state in which the reception strength is greater than the reception reference value to the state in which the reception strength is smaller than the reception reference value. The predetermined period of time may be set in advance. The notification unit 230 can clock a predetermined period using a timer circuit. The wearable input apparatus 200 may include an operation unit such that the user can stop the notification by operating the operation unit.

Although Step S32 and the combination of Steps S33 and S34 are included in FIG. 23, Step S32 or the combination of Steps S33 and S34 may be performed. In this case as well, the user becomes aware that the luminance has been reduced or that a lock has been applied.

Figure 24:
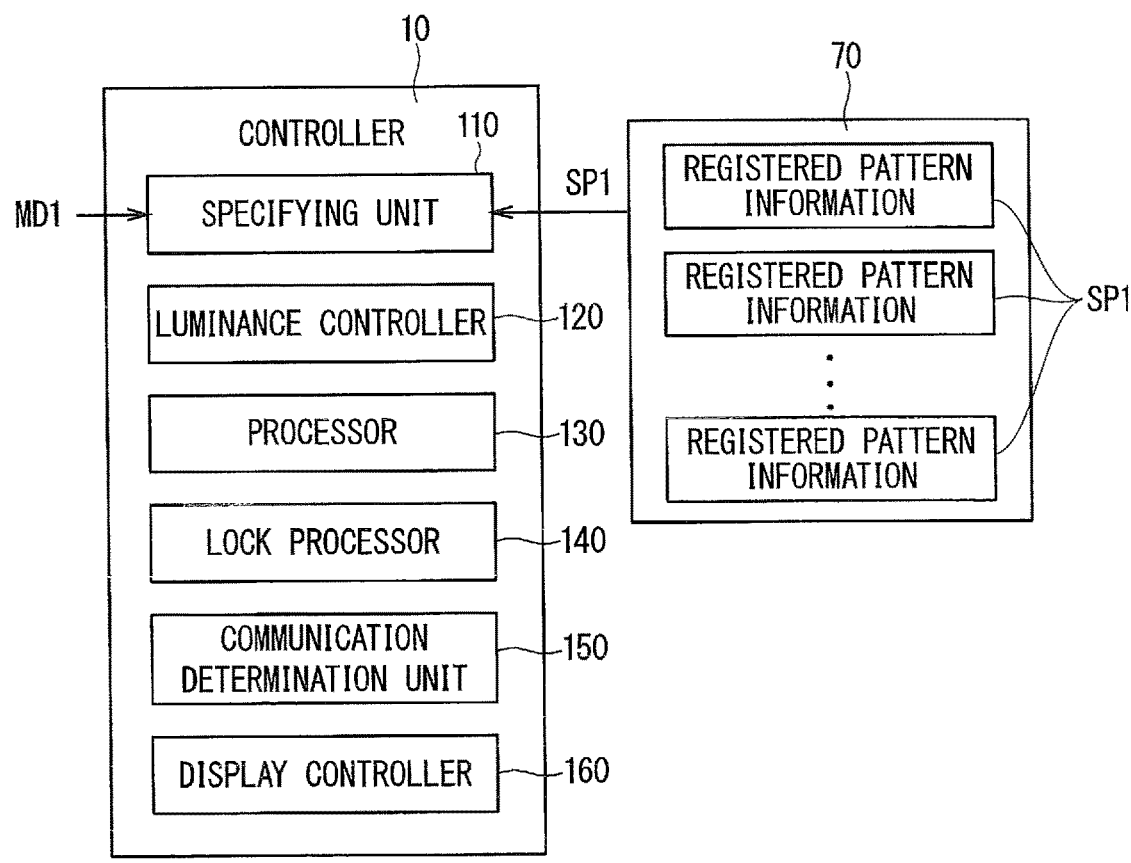
FIG. 24 schematically illustrates an example of the internal configuration of the controller.
Figure 25:
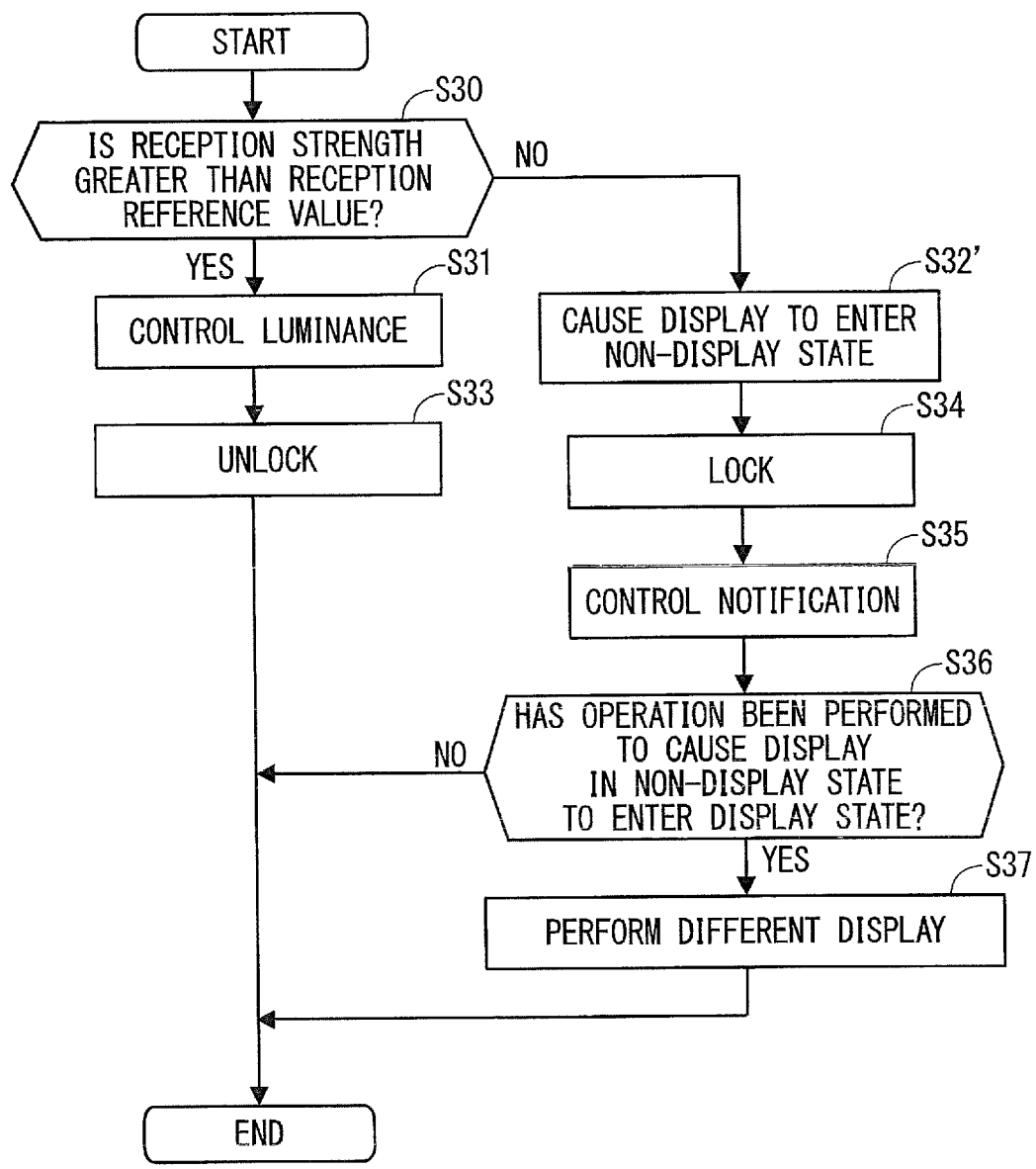
FIG. 25 illustrates a flowchart showing an example operation performed by the controller.

FIG. 24 schematically illustrates an example of the internal configuration of the controller 10. The controller 10 includes a display controller 160 in addition to the constituent components illustrated in FIG. 20. FIG. 25 illustrates a flowchart showing an example operation performed by the controller 10. FIG. 25 includes Step S32' in place of Step S32 of FIG. 23 and also includes Steps S36 and S37 in addition to the remaining steps of FIG. 23. In Step S32', the luminance controller 120 sets the luminance to zero, and the display 30 stops performing display accordingly. That is, the display 30 is placed in the non-display state.

In Step S36 subsequent to Step S35, the controller 10 determines whether an operation has been performed by using the operation unit in order to cause the display 30 to switch from the non-display state to the display state. This operation is, for example, a press down operation on the operation key 5. The key operation unit 52 can detect the press down operation on the operation key 5 and then output the information on the operation to the controller 10. Upon receipt of the information, the controller 10 makes a positive determination in Step S36 and then outputs the determination result to the display controller 160. If a determination is negative in Step S36, the operation is ended. If a determination is positive, in Step S37, the controller 10 displays, on the display 30, a dummy display screen prestored in the storage 70 or the like, instead of the latest image information stored in the storage 70 or the like. The dummy display screen is not as confidential as the latest image information stored in the storage 70.

It is sometimes hard for the user to directly operate the electronic apparatus 100 or to stop the stranger from operating the electronic apparatus 100. In such a case as well, the dummy screen different from the user's input to the electronic apparatus 100 is displayed. This can enhance the confidentiality of the user's input.

While the electronic apparatus 100 has been described above in detail, the foregoing description is in all aspects illustrative and not restrictive. It is understood that numerous modifications which have not been exemplified can be devised without departing from the scope of the present disclosure. For example, the specifying unit 110 may be included in the wearable input apparatus 200. In this case, the information on the inclination of the virtual input surface and the input corresponding to the movement of the operator body part may be transmitted from the wearable input apparatus 200 to the electronic apparatus 100.

Embodiments are applicable in combination as long as they are consistent with each other.

What is claimed is:

1. An electronic apparatus that communicates with an input apparatus worn on an operator body part, the input apparatus including a motion detector configured to detect motion information indicative of a movement of the operator body part, the electronic apparatus comprising:
   a display; and
   at least one processor configured to:
      determine a virtual input surface based on the motion information, wherein a plane of the virtual input surface is parallel to a plane of movement of the operator body part as indicated by the motion information; and
      perform a luminance control in which a luminance of the display is adjusted based on an inclination of the plane of the virtual input surface.

2. The electronic apparatus according to claim 1, wherein the at least one processor sets a first luminance and a second luminance in such a manner that the first luminance is lower than the second luminance, the first luminance being a luminance of the display in a state in which the plane of the virtual input surface is placed at a first inclination, the second luminance being a luminance of the display in a state in which the plane of the virtual input surface is placed at a second inclination steeper than the first inclination.

3. The electronic apparatus according to claim 2, wherein when the plane of the virtual input surface is at the first inclination, the at least one processor reduces the luminance of the display to cause the display to enter a non-display state.

4. The electronic apparatus according to claim 2, further comprising an input device,
   wherein when the virtual input surface is placed at the first inclination, the at least one processor imposes a restriction on an operation performed by using the input device.

5. The electronic apparatus according to claim 4, wherein the at least one processor restricts the operator body part in a manner to disable all operations performed by using the input device.

6. The electronic apparatus according to claim 4, wherein when the virtual input surface is placed at the second inclination, the at least one processor removes the restriction on the operation.

7. The electronic apparatus according to claim 2, further comprising an input device,
   wherein the at least one processor
      specifies, based on the motion information, an input corresponding to a movement of the operator body part on the virtual input surface,
      imposes and removes a restriction on an operation performed by using the operator body part, and
      disables a release input for removing the restriction on conditions that the input is the release input and that the virtual input surface on which the operator body part has been moved in a manner to correspond to the input is placed at the second inclination.

8. The electronic apparatus according to claim 2, wherein the at least one processor
   specifies, based on the motion information one by one, inputs corresponding to sequential movements of the operator body part on the virtual input surface, and
   causes the display not to display first information and to display second information on conditions that display of the first information is included in a first input specified according to a first movement of the operator body part, that display of second information is included in a second input specified according to a second movement of the operator body part, that the virtual input surface on which the first movement is made is placed at the first inclination, and that the virtual input surface on which the second movement is made is placed at the second inclination.

9. The electronic apparatus according to claim 8, wherein the at least one processor causes the display to display both the first information and third information different from the second information.

10. The electronic apparatus according to claim 1, wherein the at least one processor
    specifies, based on the motion information, an input corresponding to a movement of the operator body part on the virtual input surface, and
    performs processing corresponding to the input.

11. The electronic apparatus according to claim 2, wherein
    the motion detector includes an accelerometer configured to detect an acceleration as the motion information, and
    the at least one processor
       calculates, based on chronological data on the acceleration, a vertical value indicative of an amount of a movement of the operator body part in a vertical direction and a horizontal value indicative of an amount of a movement of the operator body part in a horizontal direction,
       judges whether the vertical value is smaller than a predetermined amount and whether the horizontal value is smaller than the predetermined amount, and
       sets a third luminance and a fourth luminance in such a manner that the third luminance is lower than the fourth luminance, the third luminance being a luminance of the display in a state in which the vertical value is smaller than the predetermined amount, the fourth luminance being a luminance of the display in a state in which the horizontal value is smaller than the predetermined amount.

12. The electronic apparatus according to claim 1, wherein
    when a communication value that is calculated based on a signal received by the electronic apparatus from the input apparatus and indicative of communication quality is greater than a predetermined reference value, the at least one processor performs the luminance control, and when the communication value is smaller than the predetermined reference value, the at least one processor reduces the luminance.

13. The electronic apparatus according to claim 1, further comprising an input device,
wherein when a communication value that is calculated based on a signal received by the electronic apparatus from the input apparatus and indicative of communication quality is smaller than a predetermined reference value, the at least one processor imposes a restriction on an operation on the input device.

14. The electronic apparatus according to claim 1, further comprising:
a storage configured to prestore a dummy display screen; and
an input device that is to be used to perform an operation for causing the display to switch from a non-display state to a display state,
wherein the at least one processor causes the display to display the dummy display screen in response to the operation performed in a state in which a communication value that is calculated based on a signal received by the electronic apparatus from the input apparatus and indicative of communication quality is smaller than a predetermined value.

15. The electronic apparatus according to claim 12, further comprising a wireless transmitter, wherein
the input apparatus includes a notification unit, and
when the communication value is smaller than the predetermined reference value, the wireless transmitter transmits, to the input apparatus, a command signal for causing the notification unit to provide notification.

16. An electronic apparatus system comprising:
an input apparatus configured to be worn on an operator body part, the input apparatus including a motion detector configured to detect motion information indicative of a movement of the operator body part; and
an electronic apparatus including
a display, and
at least one processor configured to:
determine a virtual input surface based on the motion information, wherein a plane of the virtual input surface is parallel to a plane of movement of the operator body part as indicated by the motion information; and
perform a luminance control in which a luminance of the display is adjusted based on an inclination of the plane of the virtual input surface.

17. A method for controlling an electronic apparatus that communicates with an input apparatus configured to be worn on an operator body part, the input apparatus including a motion detector configured to detect motion information indicative of a movement of the operator body part, the method comprising:
determining a virtual input surface based on the motion information, wherein a plane of the virtual input surface is parallel to a plane of movement of the operator body part as indicated by the motion information; and
controlling a luminance of a display of the electronic apparatus based on an inclination of the plane of the virtual input surface.

* * * * *